US012743441B1

(12) United States Patent
Ferreira et al.

(10) Patent No.: US 12,743,441 B1
(45) Date of Patent: Sep. 22, 2026

(54) DETECTION OF LINKS AMONG TABULAR DATA

(71) Applicant: DatasetLinks Inc., Dover, DE (US)

(72) Inventors: Francisco Ferreira, Lisbon (PT); Andrzej Grzesik, London (GB); Juan Garcia, Buenos Aires (AR); Tomasz Wylezek, Katowice (PL); Dominik Wiernicki, Warsaw (PL); Rui Lopes, Coimbra (PT)

(73) Assignee: DatasetLinks Inc., Dover, DE (US)

( * ) Notice: Subject to any disclaimer, the term of this patent is extended or adjusted under 35 U.S.C. 154(b) by 0 days.

(21) Appl. No.: 19/221,280

(22) Filed: May 28, 2025

(51) Int. Cl.
*G06F 16/00* (2019.01)
*G06F 16/21* (2019.01)
*G06F 16/22* (2019.01)
*G06F 16/242* (2019.01)
*G06F 16/25* (2019.01)

(52) U.S. Cl.
CPC .......... *G06F 16/254* (2019.01); *G06F 16/212* (2019.01); *G06F 16/221* (2019.01); *G06F 16/2237* (2019.01); *G06F 16/2255* (2019.01); *G06F 16/2282* (2019.01); *G06F 16/243* (2019.01)

(58) Field of Classification Search
None
See application file for complete search history.

(56) References Cited

U.S. PATENT DOCUMENTS 9,613,109 B2 * 4/2017 Wright .................. H04L 63/101
11,157,498 B1 * 10/2021 James ..................... G06F 9/542
11,727,028 B2 * 8/2023 Xu ........................ G06F 16/283
707/602
11,755,617 B2 * 9/2023 Motivala ............... G06F 9/5016
707/634
12,271,688 B1 * 4/2025 Moreno ................. G06Q 10/04
12,393,890 B1 * 8/2025 Moreno .................. G06F 21/62
12,393,891 B1 * 8/2025 Moreno ............. G06Q 10/0631
12,481,670 B2 * 11/2025 Mittal ................. G06F 16/2282
2010/0306219 A1 * 12/2010 Sthanikam .......... G06F 16/8365
707/769
2016/0335329 A1 * 11/2016 Teodorescu ........... G06F 16/113
2018/0196859 A1 * 7/2018 Srivastava .......... G06F 16/2365
(Continued)

OTHER PUBLICATIONS

Zheng, V. W., Zheng, Y., Xie, X., & Yang, Q. (Apr. 2010). Collaborative location and activity recommendations with gps history data. In Proceedings of the 19th international conference on World wide web (pp. 1029-1038). (Year: 2010).*
(Continued)

*Primary Examiner* — Farhan M Syed
(74) *Attorney, Agent, or Firm* — Van Pelt, Yi & James LLP

(57) ABSTRACT

Detection of links among tabular data is disclosed, including: obtaining a set of source data; extract portions from the set of source data to store in cells within a source dataset according to a source schema determined for the set of source data; determining a link between a first data value stored in a first cell of the source dataset to a second data value stored in a second cell of a destination dataset of stored tabular data; and in response to a search that matches the first data value stored in the first cell, returning the first data value stored in the first cell and the second data value stored in the second cell based at least in part on the link.

18 Claims, 24 Drawing Sheets

(56) References Cited

U.S. PATENT DOCUMENTS

| | | | | |
|---|---|---|---|---|
| 2022/0043826 | A1* | 2/2022 | Zorin | G06F 16/254 |
| 2022/0237194 | A1* | 7/2022 | Patel | G06F 16/26 |
| 2024/0152493 | A1* | 5/2024 | Goddijn | G06F 16/215 |
| 2024/0354584 | A1* | 10/2024 | Mukherjee | G06F 16/3344 |
| 2025/0005076 | A1* | 1/2025 | Armbrust | G06F 16/9024 |
| 2025/0231945 | A1* | 7/2025 | Leibundguth | G06F 16/24554 |
| 2025/0259255 | A1* | 8/2025 | Penrose | G06F 16/7844 |
| 2025/0284701 | A1* | 9/2025 | Failer | H04L 69/04 |

OTHER PUBLICATIONS

Cao, X., Cong, G., & Jensen, C. S. (2010). Mining significant semantic locations from GPS data. Proceedings of the VLDB Endowment, 3(1-2), 1009-1020. (Year: 2010).*

Lourenço, C. (2025). Advanced data science techniques for spatio-temporal analysis of urban traffic patterns using floating vehicle data. (Year: 2025).*

Farrokhtala, A., Chen, Y., Hu, T., & Ye, S. (May 2018). Toward understanding hidden patterns in human mobility using wi-fi. In 2018 IEEE Canadian Conference on Electrical & Computer Engineering (CCECE) (pp. 1-4). IEEE. (Year: 2018).*

Anonymous, "Enabling Interoperability and Preventing Lock-In with Foundry", Palantir Technologies Inc. 2022.

James Hoffman. Introduction to structured query language. J. Hoffman, 1996.

* cited by examiner

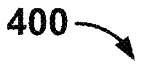
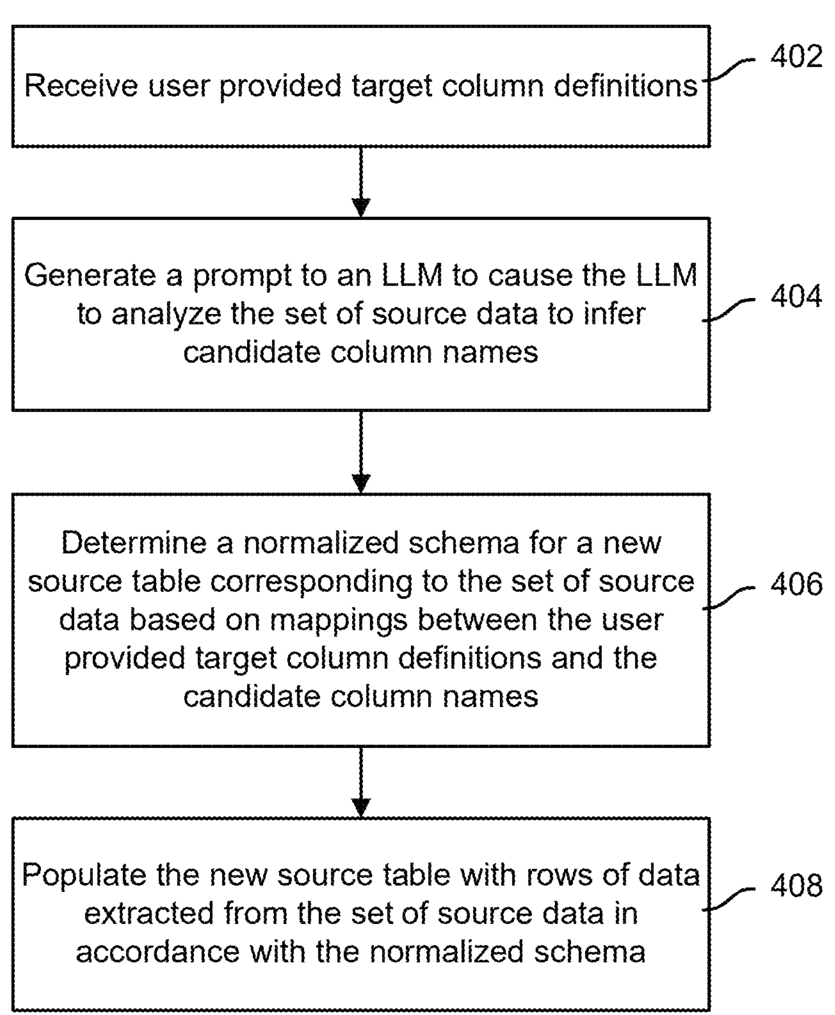
FIG. 4 datalinks.com/dashboard/f-linksIsKC/examples/reviews1

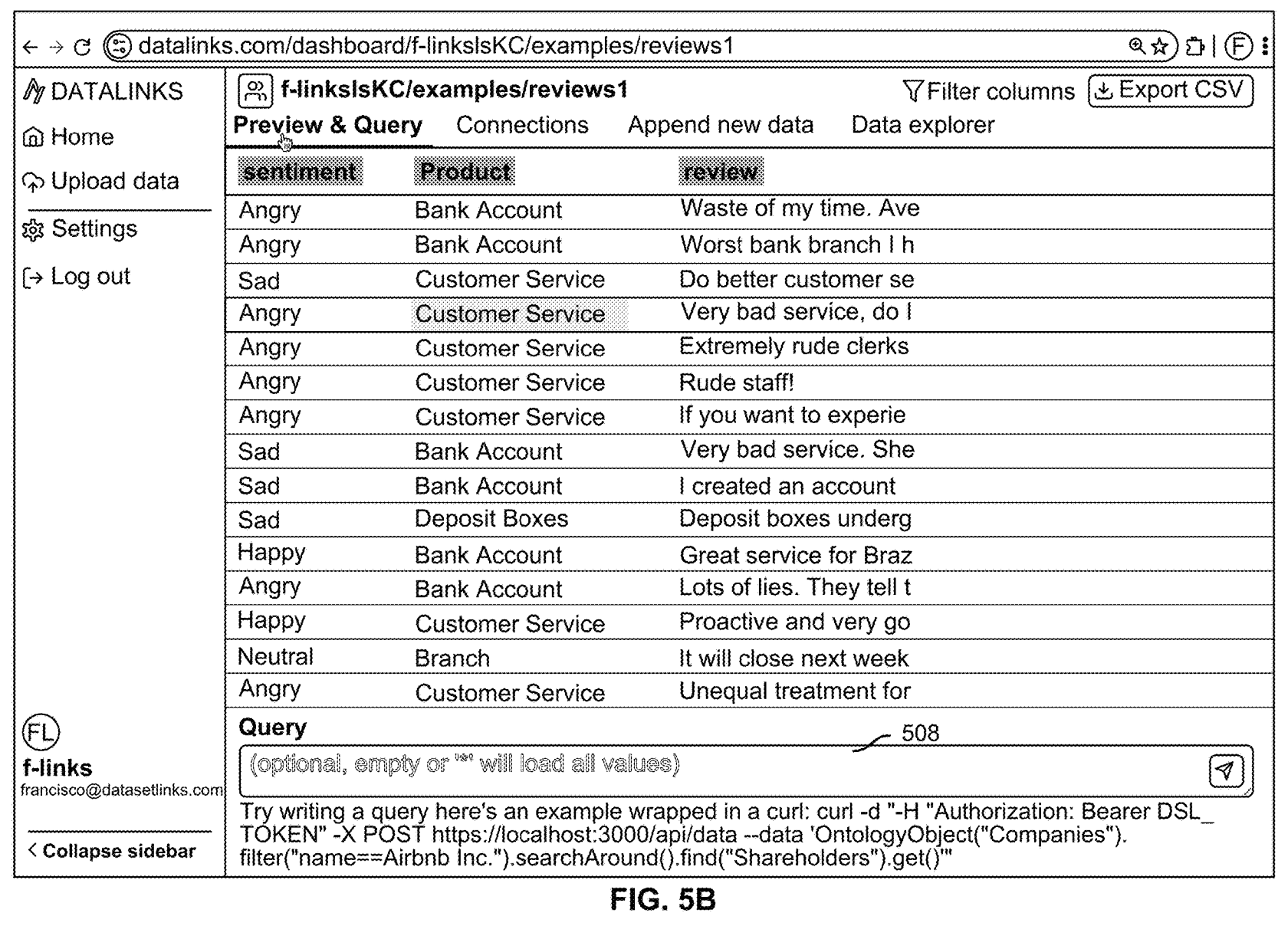

DATALINKS
Home
Upload data
Settings
Log out f-linksIsKC/examples/reviews1
Filter columns
Export CSV
Preview & Query
Connections
Append new data
Data explorer

| sentiment | Product | review |
|---|---|---|
| Angry | Bank Account | Waste of my time. Ave |
| Angry | Bank Account | Worst bank branch I h |
| Sad | Customer Service | Do better customer se |
| Angry | Customer Service | Very bad service, do I |
| Angry | Customer Service | Extremely rude clerks |
| Angry | Customer Service | Rude staff! |
| Angry | Customer Service | If you want to experie |
| Sad | Bank Account | Very bad service. She |
| Sad | Bank Account | I created an account |
| Sad | Deposit Boxes | Deposit boxes underg |
| Happy | Bank Account | Great service for Braz |
| Angry | Bank Account | Lots of lies. They tell t |
| Happy | Customer Service | Proactive and very go |
| Neutral | Branch | It will close next week |
| Angry | Customer Service | Unequal treatment for |

Query
508
(optional, empty or "*" will load all values)

Try writing a query here's an example wrapped in a curl: curl -d "-H "Authorization: Bearer DSL_TOKEN" -X POST https://localhost:3000/api/data --data 'OntologyObject("Companies").filter("name==Airbnb Inc.").searchAround().find("Shareholders").get()'"

FL
f-links
francisco@datasetlinks.com
Collapse sidebar

FIG. 5B

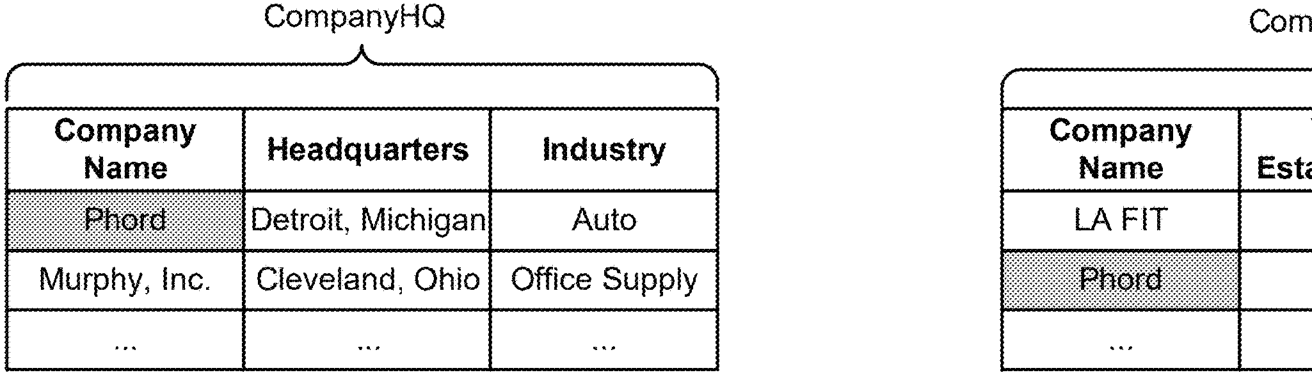

CompanyHQ

| Company Name | Headquarters | Industry |
|---|---|---|
| Phord | Detroit, Michigan | Auto |
| Murphy, Inc. | Cleveland, Ohio | Office Supply |
| ... | ... | ... |

CompanyCEO

| Company Name | Year of Establishment | CEO Name |
|---|---|---|
| LA FIT | 1905 | John Smith |
| Phord | 1966 | Alice Pom |
| ... | ... | ... |

ExactMatch Link Index

| Hash table Key | Cell of Origin |
|---|---|
| Phord | CompanyHQ.CompanyName; CompanyHQ.CompanyName |
| Murphy, Inc. | CompanyHQ.CompanyName |
| Detroit, Michigan | CompanyHQ.Headquarters |
| Cleveland, Ohio | CompanyHQ.Headquarters |
| Auto | CompanyHQ.Industry |
| Office Supply | CompanyHQ.Industry |
| ... | ... |

FIG. 8

CompanyHQ

| Company Name | Headquarters | Industry |
| --- | --- | --- |
| Phord | Detroit, Michigan | Auto |
| Murphy, Inc. | Cleveland, Ohio | Office Supply |
| ... | ... | ... |

TopEmployer

| City | Top Employer |
| --- | --- |
| Detroit, Michigan | Phord |
| Des Moines, Iowa | RiskManager |
| ... | ... |

Fuzzy Match Link Index

| Source Table Cell | Destination Table Cell |
| --- | --- |
| CompanyHQ.CompanyName.row1 | TopEmployer.City.row1 |
| ... | ... |

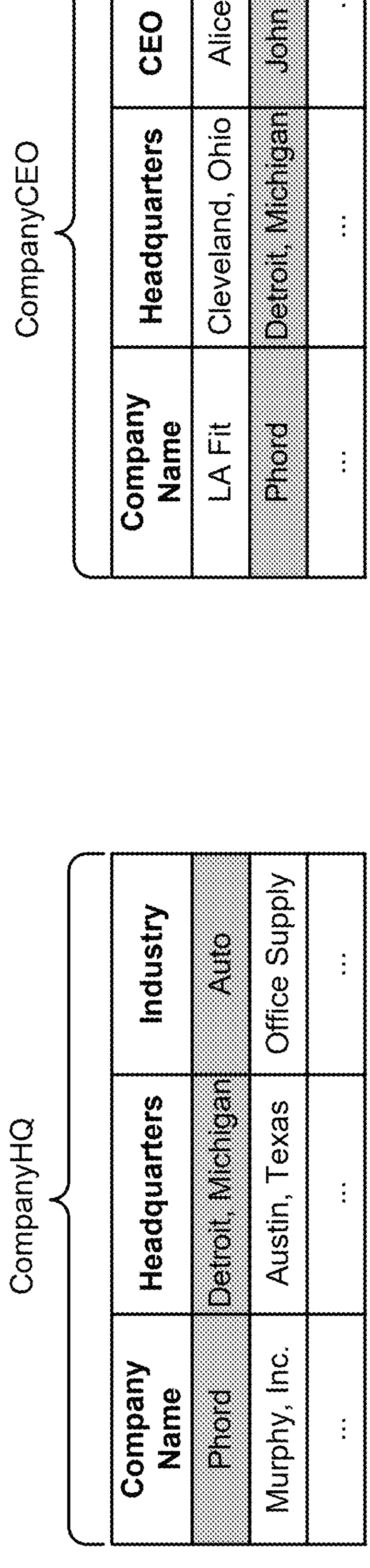
CompanyHQ
| Company Name | Headquarters | Industry |
| --- | --- | --- |
| Phord | Detroit, Michigan | Auto |
| Murphy, Inc. | Austin, Texas | Office Supply |
| ... | ... | ... |
CompanyCEO
| Company Name | Headquarters | CEO Name |
| --- | --- | --- |
| LA Fit | Cleveland, Ohio | Alice Pom |
| Phord | Detroit, Michigan | John Smith |
| ... | ... | ... |
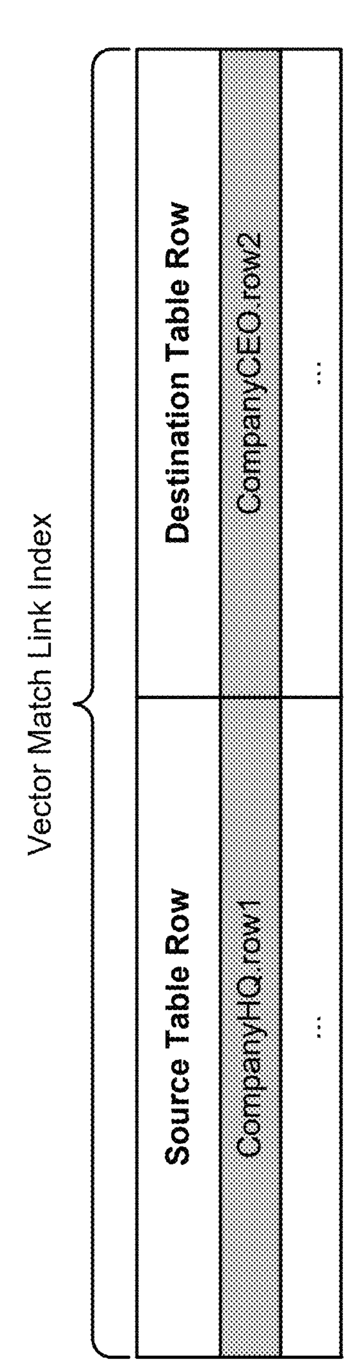
Vector Match Link Index
| Source Table Row | Destination Table Row |
| --- | --- |
| CompanyHQ.row1 | CompanyCEO.row2 |
| ... | ... |
FIG. 12

PhordDealerships

| Branch | GPS Data |
| --- | --- |
| W. Alexandrine St., Detroit, MI | 42.345721, -83.075074 |
| 5th St., Ann Arbor, MI | 42.273977, -83.755824 |
| ... | ... |

BarnacleGasStations

| Locations | GPS Data |
| --- | --- |
| Whitney St., Detroit, MI | 42.363037, -83.104085 |
| South Linden, Columbus, OH | 40.000731, -82.981030 |
| ... | ... |

Geographical Match Link Index

| Source Table Row | Destination Table Row |
| --- | --- |
| PhordDealerships.Branch.W.Alexandrine | BarnacleGasStations.Locations.Whitney |
| ... | ... |

CompanyHQ

| Company Name | Headquarters | Taxonomy |
| --- | --- | --- |
| Phord | Detroit, Michigan | Auto Maker<br>Auto Seller<br>Engine Maker |
| ... | ... | ... |

EuroAutoMakers

| Company Name | Year Established | Taxonomy |
| --- | --- | --- |
| VBM | 1902 | Auto Maker<br>Auto Seller<br>Motorcycle Maker |
| ... | ... | ... |

Related Entities Link Index

| Source Table Row | Destination Table Row |
| --- | --- |
| CompanyHQ.row1 | EuroAutoMakers.row1 |
| ... | ... |

AirplaneMaintenance

| Part | Maintenance Type | Timestamp |
| --- | --- | --- |
| Engine | Swap | 04:30PM 2024.04.30 |
| Toilet Seat | QuickFix | 06:00PM 2024.05.01 |
| ... | ... | ... |

Flights

| Tail No. | Arrival Time | Flight No. | Departure Time |
| --- | --- | --- | --- |
| US Air 4567 | 11:00AM 2024.05.01 | DA999 | 10:00PM 2024.05.01 |
| US Air 1234 | 04:00PM 2024.05.01 | DA002 | 08:00PM 2024.05.01 |
| ... | ... | ... | ... |

Overlapping Windows Link Index

| Source Table Row | Destination Table Row |
| --- | --- |
| AirplaneMaintenance.row2 | Flights.row2 |
| ... | ... |

FIG. 17

Detected Links Table

| | Source Table | Destination Table | Link Type | Hits | Applied On |
|---|---|---|---|---|---|
| 1802 | SourceTableA | DestinationTable1 | Exact Match | 60 | On Cells |
| 1804 | SourceTableA | DestinationTable2 | Fuzzy Match | 2 | On Cells |
| 1806 | SourceTableA | DestinationTable2 | Geo Link | 8 | On Rows |
| 1808 | SourceTableA | DestinationTable3 | Related Entity Match Link | 32 | On Rows |
| | ... | ... | ... | ... | ... |

FIG. 18

DETECTION OF LINKS AMONG TABULAR DATA

BACKGROUND OF THE INVENTION

Conventional relational databases organize data in tables with predefined relationships. In particular, in a relational database, a table is assigned a "primary key," which is a column that stores a unique value for each row of the table. Also, in a relational database, a "foreign key" is one or more columns in a first table that references a column (typically the primary key) in a second table and therefore provides a link between the two tables. However, primary and foreign keys of relational databases offer limited representation of relationships among the tabular data.

Conventional graph databases use graph structures to store data. In a graph structure, an "edge" represents the relationship between two "nodes," where a node represents an entity of an instance of an entity. However, relationships among data that is stored in graph databases are not stored in tabular form, which is typically the preferred form for business data.

It would be desirable to capture flexible and arbitrary relationships among data stored in tabular form.

BRIEF DESCRIPTION OF THE DRA WINGS various embodiments of the invention are disclosed in the following detailed description and the accompanying drawings.

FIG. 4 is a flow diagram showing an example of a process for ingesting source data in accordance with some embodiments.

FIG. 5B shows an example user interface that presents a source table that was built from the ingested source data that was submitted over the example user interface of FIG. 5A.

FIG. 8 shows an example of detecting cell-level exact match links between a pair of tables in accordance with some embodiments.

FIG. 12 shows an example of detecting row-level vector match links between a pair of tables in accordance with some embodiments.

FIG. 17 is a diagram showing an example of tables for which row-level overlapping windows type of link is determined in accordance with some embodiments.

FIG. 18 is a diagram showing an example detected links table in accordance with some embodiments.

DETAILED DESCRIPTION

Figure 1:
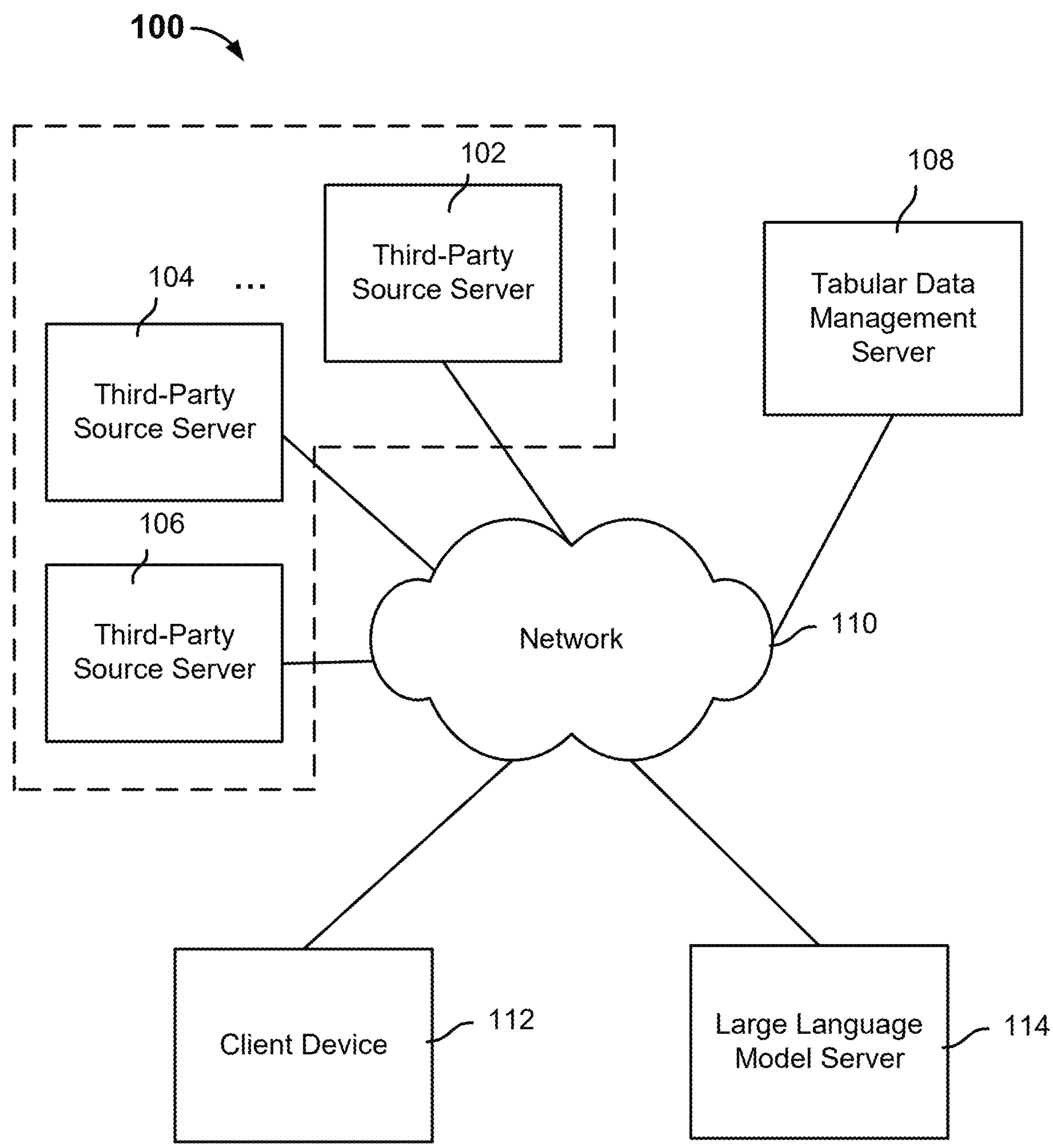
FIG. 1 is a diagram showing an embodiment of a system for detecting links among tabular data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detection of links among tabular data are described herein. One or more sets of source data are obtained. For example, the sets of source data may include structured data (e.g., data in a comma-separated values or table format) or unstructured data (e.g., free form text). For example, the sets of source data may be submitted over a user interface and/or obtained via an application programming interface (API). Portions from the one or more sets of source data to store in cells within a source dataset according to a source schema that is determined for the one or more sets of source data are extracted. In some embodiments, a "source dataset" comprises one or more source tables that are to be generated from the ingested sets of source data. In some embodiments, a source "schema" comprises the name(s) of the columns of the generated source dataset table(s) being generated and descriptions of content to be stored in each column of the source dataset table(s). In some embodiments, the source dataset schema is inferred from the obtained set(s) of source data and/or user provided column field definitions. Put another way, cells of the source dataset table(s) organized according to the source dataset schema are populated with data values that are extracted from the obtained set(s) of source data. A link is detected between a first data value in a first cell of the source dataset and a second data value stored in a second cell of a destination dataset of stored tabular data. In various embodiments, "stored tabular data" comprises stored tables of data, which in relation to the "source dataset" derived from the ingested source data are referred to as "destination" datasets. For example, stored tabular data may include tables derived from previously ingested sets of source data (e.g., that have been provided by one or more organizations) and tables of data derived or directly obtained from third-parties. As will be described further below, one or more types of links (or sometimes referred to as "entity resolutions") can be detected between a cell (e.g., within any row) or a set of cells (e.g., arranged in a row) of a source dataset table and a cell (e.g., within any row) or a set of cells (e.g., arranged in a row) of a destination dataset table. In various embodiments, a "link" refers to a type of relationship/connection/proximity (e.g., a close or fuzzy match, a real-world proximity, a temporal proximity, etc.) between an at least portion of a source dataset and a corresponding at least portion of a destination dataset. In various embodiments, links that are inferred between a portion (e.g., a cell, a row, or other subset) of the source dataset and any portions (e.g., cell(s), row(s), or other subset(s)) of destination datasets within the stored tabular data are stored. In response to a subsequently received search that matches the first data value stored in the first cell of the source dataset, not only is the first data value in the first cell of the source dataset returned but so is the second data value based on the previously detected/stored link between the two data values.

FIG. 1 is a diagram showing an embodiment of a system for detecting links among tabular data. In some embodiments, system 100 includes third-party source server 102, third-party source server 104, third-party source server 106, tabular data management server 108, network 110, client device 112, and large language model server 114. Each of third-party source server 102, third-party source server 104, third-party source server 106, tabular data management server 108, client device 112, and large language (LLM) model server 114 communicates to each other over network 110.

Tabular data management server 108 is configured to periodically obtain new and/or updated publicly available and/or proprietary data from one or more data suppliers such as, for example, third-party source servers 102, 104, and 106. For example, the publicly available and/or proprietary data may include news, analysis, forecast data, reports, trend data, inventory, and records. Data obtained from data suppliers such as, for example, third-party source servers 102, 104, and 106 may have been structured or unstructured. If the data obtained from a data supplier were not already in tabular form, tabular data management server 108 is configured to convert the obtained data into a dataset of tabular form using an ingestion process, as will be described further below, and store the tables of data obtained from data suppliers. Tabular data management server 108 is also configured to store tables of previously ingested user provided data. Each table that is stored by tabular data management server 108 is associated with a set of permissions including permissions for which users can view/access the table, which other tables against which links can be detected, and which users for which links associated with the table can be surfaced/presented.

Tabular data management server 108 is configured to ingest user provided source data. For example, the user provided source data may be obtained by tabular data management server 108 from client device 112 via a user interface provided by tabular data management server 108. In another example, the user provided source data may be obtained by tabular data management server 108 from client device 112 via an API provided by tabular data management server 108. For example, the user provided source data can be proprietary data belonging to an organization (e.g., an enterprise or an institution) and/or public data obtained from one or more third-party sources. The user provided source data may include structured or unstructured data (e.g., free text). In some embodiments, the user provided source data is additionally provided with user definitions of column fields. For example, the user definitions of column fields (e.g., which could have been submitted to tabular data management server 108 via a user interface or an API) describe descriptions of column names to be used in a source dataset (e.g., table) to store extracted portions of the source data, as well as, potentially, the industry and the type of information that is included in the provided source data. In some embodiments, tabular data management server 108 is configured to send a prompt to an LLM that is provided by a server such as LLM server 114 to infer a candidate set of column names to be used in a table for storing data to be extracted from the user provided source data. Then, tabular data management server 108 is configured to normalize the user definitions of column fields with the candidate set of column names output by the LLM to determine a normalized, source schema to use as the schema of the source dataset (comprising one or more source tables) to be populated with data values from the user provided source data. The normalized schema includes one or more column names of the source dataset and the description of content to be stored in each such column. Tabular data management server 108 is configured to extract data from the source data in accordance with the source schema to populate the source dataset table(s) with rows of extracted data and where each row includes one or more data values extracted/inferred from the user provided source data stored under respective each column of the source schema. In particular, the intersection of a column and row of a source dataset table is a "cell," which stores one or more data values extracted from the source data that are relevant to the entity represented by the row and that column. In some embodiments, in addition to populating the source dataset table(s) with data extracted from the user provided source data, tabular data management server 108 is configured to derive enrichment data from the extracted values populated into the source dataset and add one or more additional columns into the source schema to store the enrichment data.

After ingesting an instance of user provided source data and deriving one or more source tables from the ingested data, tabular data management server 108 is configured to detect the existence of any links (of one or more types) between portions of the source table(s) with portions of stored tables (e.g., of data obtained from a data supplier and/or previously ingested user provided source data). In particular, tabular data management server 108 is configured to detect whether a cell, a group of cells, a row, and/or a group of rows in a source table is linked to a cell, a group of cells, a row, and/or a group of rows in another table (a "destination" table relative to the source table) that is already stored by tabular data management server 108. As will be described in further detail below, tabular data management server 108 is configured to perform entity resolution on each cell or row of a source table by determining whether the data value(s) of that cell/row can be linked (via one or more types of links) to a counter cell/row in a destination table. Examples of link type include exact match, fuzzy match, vector match, geographical proximity, related entities, and overlapping windows. Detected links of one or more types between portions (e.g., cell(s) and/or row(s)) of each source table to corresponding portions (e.g., cell(s) and/or row(s)) of one or more destination tables are stored by tabular data management server 108.

Tabular data management server 108 is configured to enable a user to search through its stored tabular data as well as programmatically detected links between portions of different tables. In some embodiments, tabular data management server 108 can receive a user submitted question written in natural language from a client device such as client device 112 over a user interface. For example, the user may request to directly receive matching data from the stored tabular data maintained by tabular data management server 108 or request that matching data from the stored tabular data maintained by tabular data management server 108 is then provided by tabular data management server 108 as context to a downstream service (e.g., the matching data is formatted and provided as context in a prompt to an LLM). In some embodiments, tabular data management server 108 is configured to prompt an LLM, such as one provided by LLM server 114, to translate the user provided question into a proprietary query language query. Tabular data management server 108 is configured to then run the proprietary query language query against the stored tabular data. For example, in running the proprietary query language query against the stored tabular data, tabular data management server 108 is configured to first determine and load portion(s) (e.g., cell(s) or row(s)) of a matching table that match the query. Then, tabular data management server 108 is configured to determine whether there are stored links between the matching portion(s) (e.g., cell(s) or row(s)) of the matching table and any portion(s) of other stored, destination tables. If such link(s) exist, then tabular data management server 108 is configured to load such links (including the link types) and also the linked-to portion(s) of the other stored, destination tables. As such, for the given user question, tabular data management server 108 would not only return to the requesting client device the data values from the matching portion(s) (e.g., cell(s) or row(s)) of the matching table, but also the type(s) of link(s) that have been detected between the matching portion(s) of the matching table as well as the data values from the portions of any destination tables to which the detected links pointed/referenced. In some embodiments, due to the potentially large volume of loaded links, prior to returning all loaded links, tabular data management server 108 is configured to evaluate whether some of such loaded links should be hidden/pruned (e.g., not returned to the user) from the search results due to one or more factors (e.g., the confidence of the detected links). As suggested above, in the event that the initial user request included a question that is ultimately to be passed to an LLM (such as one provided by LLM server 114), tabular data management server 108 is configured to programmatically generate a prompt to the LLM that includes the question as well as the described matching data and links as additional context to the downstream LLM. The matching portions of tabular data and links thereof will provide helpful context to the LLM for the LLM to more accurately respond to the user provided question. In some embodiments, tabular data management server 108 is configured to receive the response from the LLM and then return the response to the device (e.g., client device 112) of the requesting user.

As shown in FIG. 1, tabular data management server 108 is configured to ingest disparate sources and forms of data and transform them into tabular form. Furthermore, tabular data management server 108 is configured to leverage a large variety of initially unrelated tables of data by detecting links (of one or more types) among granular portions of different tables to build a knowledge map. The stored data in tabular representation as well as the granular links between portions of different tables (which can be represented as paths of connected nodes) can be efficiently searched/queried to provide insightful search results (which can be represented as paths of connected nodes) and also provide helpful context that is readily digestible by downstream services, such as LLMs, for example.

Through empirical testing, by injecting linked data in a prompt to an LLM, the LLM is provided semantic context that will enable the LLM to reason around the links, the types of links, and the exact results that were followed to reach the query answer. The result of injecting lineage of a tabular query result into a prompt to the LLM effectively provides the LLM with context knowledge of why the answer was generated in the first place, allowing the LLM to generate much better and non-hallucinated answers that are grounded in the provided context obtained from the stored tabular data.

Figure 2:
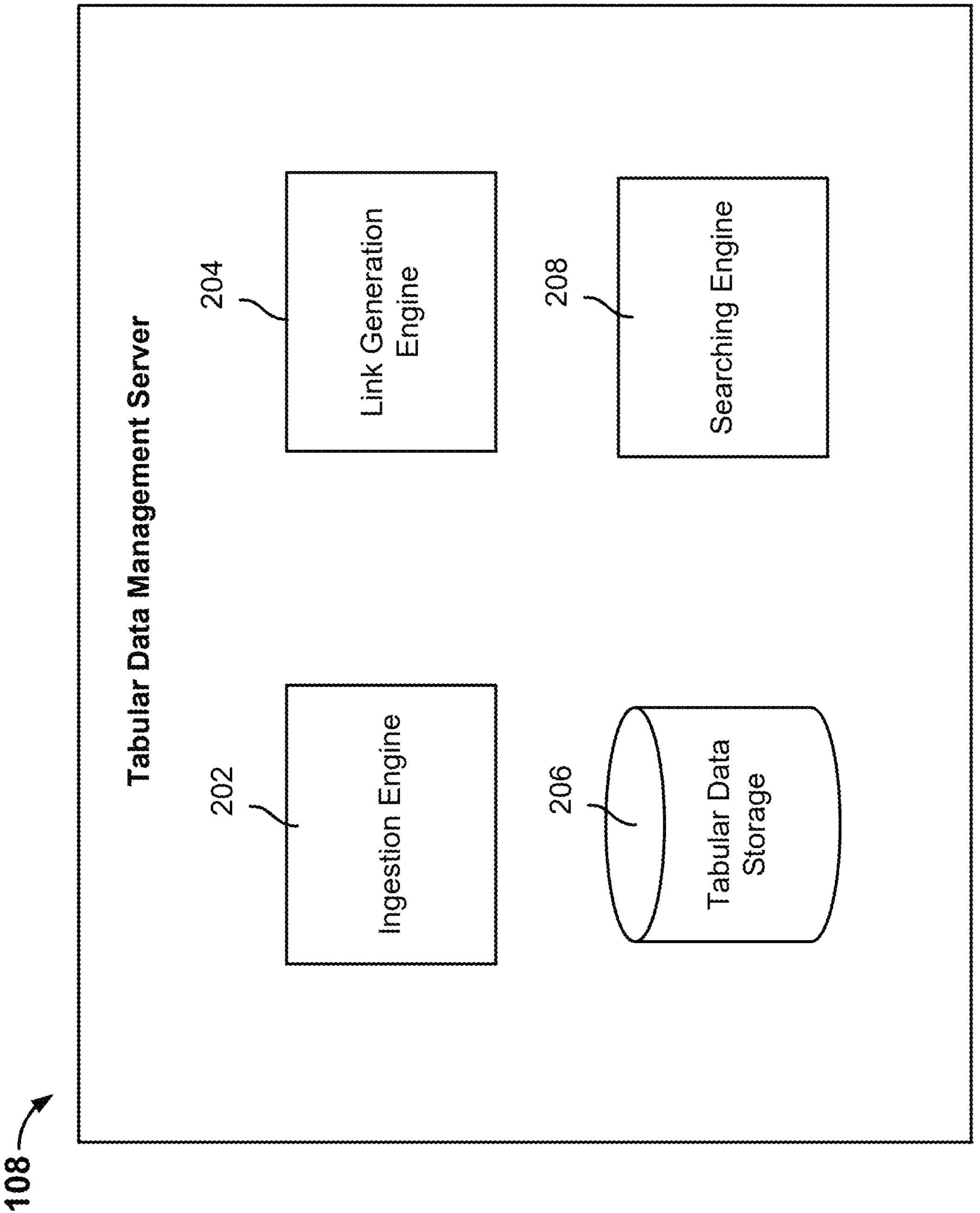
FIG. 2 is a diagram showing an example of a tabular data management server in accordance with some embodiments.

FIG. 2 is a diagram showing an example of a tabular data management server in accordance with some embodiments. In some embodiments, tabular data management server 108 of FIG. 1 may be implemented in the example tabular data management server of FIG. 2. As shown in FIG. 2, the example tabular data management server includes ingestion engine 202, link generation engine 204, tabular data storage 206, and searching engine 208. Each of ingestion engine 202, link generation engine 204, tabular data storage 206, and searching engine 208 may be implemented using hardware (e.g., one or more processors and one or more memories) and/or software.

Ingestion engine 202 is configured to ingest a set of user provided source data and generate source datasets (e.g., tables) from the user provided source data. In some embodiments, ingestion engine 202 is configured to receive a set of user provided source data submitted over a user interface provided by ingestion engine 202. In some embodiments, ingestion engine 202 is configured to receive a set of user provided source data submitted using an API that is used by ingestion engine 202. For example, a set of user provided source data may comprise one or more documents of one or more formats (e.g., Microsoft Word documents, PDFs, CSvs, Microsoft Excel, text files), structured text, and/or free text (e.g., unstructured text). Some specific examples of user provided source data may include forecast data, news articles, earnings reports, and reviews of a company. In response to the uploaded user provided source data, ingestion engine 202 is configured to convert the uploaded user provided source data into one or more structured source datasets. For example, a source dataset comprises a table (or is sometimes referred to as a "source table"). In some embodiments, ingestion engine 202 is further configured to receive a set of user definitions of column fields for the source table to be derived from a corresponding set of uploaded source data. For example, the set of user definitions of column fields describes the industry and type of the set of source data and/or proposed names and definitions of content to be stored in each column to be included in the source table. In some embodiments, ingestion engine 202 is configured to structure the source table based directly on the set of user definitions of column fields. In some embodiments, instead of structuring the source table based on just the set of user definitions of column fields, ingestion engine 202 is configured to generate a prompt to an LLM or other type of artificial intelligence (AI) service (e.g., an AI agent) and where the prompt requests the LLM to infer candidate column names/properties from the set of user provided source data. Ingestion engine 202 is then configured to compare the candidate column names/properties obtained from the LLM (or other AI service) to the set of user definitions of column fields to determine a normalized schema (e.g., a set of normalized column names and description of content to be stored under each normalized column name) for the source table.

After obtaining the normalized schema for the source table to be generated for a given set of user provided source data, ingestion engine 202 is configured to extract data values from the set of user provided source data to populate the source data with rows of data in accordance with the normalized schema. For example, to populate the source table, ingestion engine 202 is configured to first identify the subject/entity/unit with which each row is to pertain to an instance thereof. Then for each row of data pertaining to an instance of the identified subject/entity/unit, ingestion engine 202 is configured to extract for each column of the source schema, one or more data values from the user provided source data that relates to that instance of the identified subject/entity/unit and the description of that column and then store it in the corresponding cell of the source table. In some embodiments, if a column within the normalized schema describes content that cannot be extracted from the exact text of user provided source data, then ingestion engine 202 is configured to derive/infer data values from the exact text of user provided source data to populate the cells in that column. For example, examples of such columns for which derived and not exact data from the user provided source data is relevant include sentiment and language.

In some embodiments, ingestion engine 202 is configured to add enrichment data to the source table that is derived from a set of user provided source data. In some embodiments, adding enrichment data to the source table includes adding one or more predefined, enrichment columns (that were not user defined or inferred by the LLM) to the normalized schema of a source table. For example, examples of predefined, enrichment columns may include Global Positioning System (GPS) coordinates and taxonomy/category. In some embodiments, if an enrichment column describes content that cannot be extracted from the exact text of user provided source data, then ingestion engine 202 is configured to derive/infer data values from the exact text of user provided source data to populate the cells in that enrichment column.

Ingestion engine 202 is configured to store the source table(s) (e.g., with enrichment data) derived from a set of user provided source data at tabular data storage 206.

Link generation engine 204 is configured to detect for the existence of links of one or more types between portions of a source table (e.g., generated by ingestion engine 202 during the ingestion of a set of user provided source data) stored at tabular data storage 206 and portions of one or more other tables stored at tabular data storage 206. In relation to a source table, each other table stored at tabular data storage 206 may be referred to as a "destination" table. The other/destination tables that are stored at tabular data storage 206 may include data that is obtained from third-party data suppliers and/or previously ingested source data provided by one or more users. Each table may be associated with a set of permissions including, for example, a permission that describes the other types of tables against which the table in question can be compared for link detection. In some embodiments, link generation engine 204 is configured to perform entity resolution on each cell (or row) of the source table including by evaluating the data value(s) in that cell against the data value(s) stored in each counter cell (or row) in a candidate destination table stored at tabular data storage 206. For example, a "candidate" destination table is a destination table that is associated with a permission that allows its data values to be evaluated against those of the source table for the purpose of link detection. As will be described in further detail below, in some embodiments, the data value(s) of each cell of the source table can be evaluated against the data value(s) in each counter cell of each candidate destination table to detect one or more types of cell-level links. Examples of cell-level types of links include exact match and fuzzy match. Also, as will be described in further detail below, in some embodiments, the data value(s) of each row of the source table can be evaluated against the data value(s) in each counter row of each candidate destination table to detect one or more types of row-level types of links. Examples of row-level types of links include vector match, geo-linking, related entities, and overlapping windows. As such, link generation engine 204 is configured to detect links between one or more cells and/or one or more rows of each source table and counter one or more cells and/or one or more rows in one or more candidate destination tables. Put another way, link generation engine 204 is configured to detect links between pairs of source and candidate destination tables at granularities including, for example: cell-to-cell, cell-to-a group of cells, a group of cells-to-cell, a group of cells-to-group of cells, row-to-row, row-to-a group of rows, a group of rows-to-row, and a group of rows-to-a group of rows.

Given that the candidate destination tables relative to a source table may be data that is external or otherwise inaccessible to the user/organization that had provided the source data that was ingested to build the source table, the links between the source table and each candidate destination table may identify a valuable/new insight/context/connection relative to the data of the source table. Link generation engine 204 is configured to store such links between portions (e.g., cell(s) and/or row(s)) of pairs of source and candidate destination tables at tabular data storage 206.

Searching engine 208 is configured to perform searching of tabular data and linking of data stored at tabular data storage 206. In some scenarios, users may want to search through the tabular form of the source data that they (or their associated organization) have previously provided to ingestion engine 202. In some other scenarios, users may want to search through not only the tabular forms of the source data that they (or their associated organization) have previously provided to ingestion engine 202 but also other data that may be linked to their source data and that may be external to their organization and/or otherwise unavailable or inaccessible to them. In some embodiments, searching engine 208 is configured to provide a user interface that is accessible by a user using a client device (e.g., client device 112) over which to submit a question, which may be written in natural language. In response to receiving the user submitted question, searching engine 208 is configured to generate a prompt to an LLM (not shown in FIG. 2) to request the LLM to derive from the natural language question a tabular data-specific query in a customized query language that is operable to search against stored tabular data and also stored links associated with the tabular data. Searching engine 208 is then configured to run the tabular data-specific query output by the LLM against the stored tabular data and also stored links at tabular data storage 206. In some embodiments, to run the tabular data-specific query output by the LLM against the stored tabular data and also stored links at tabular data storage 206, searching engine 208 is configured to first find a matching table to the query. Then, from the matching table, searching engine 208 is configured to identify the matching cell(s) and/or row(s) of the matching table that match the query. Next, searching engine 208 is configured to look up the stored links to determine whether the matching cell(s) and/or row(s) of the matching table are linked to any counter cell(s) and/or row(s) of any destination tables. As such, in some embodiments, searching engine 208 can return to the requesting user (e.g., present at the user interface at the client device), not only the data value(s) stored in the matching cell(s) and/or row(s) of the matching table but also, if any, the type(s) of link(s) that the data values of each such matching cell/row share with cell(s) and/or row(s) of destination table(s) (a table other than the matching table), as well as the linked to data values from the cell(s) and/or row(s) of the destination table(s). The matching data can then form one or more series/paths of linked nodes from the stored tabular data and where the nodes are portions of stored tables and the links are the links detected between adjacent nodes. In some embodiments, the user that submitted the user question may also request that searching engine 208 pass the original user question along with the returned matching data, links, and linked-to data as context to a downstream (e.g., AI) service, such as an LLM. In that event, searching engine 208 is configured to form the matching data, links, and linked-to data in a format (e.g., a set of strings) that can be included as context in a generated prompt that requests the downstream LLM to answer the user question given the provided context. Searching engine 208 can also return (e.g., present at the user interface at the client device) the LLM's response to the user question with the given context back to the requesting user.

Figure 3:
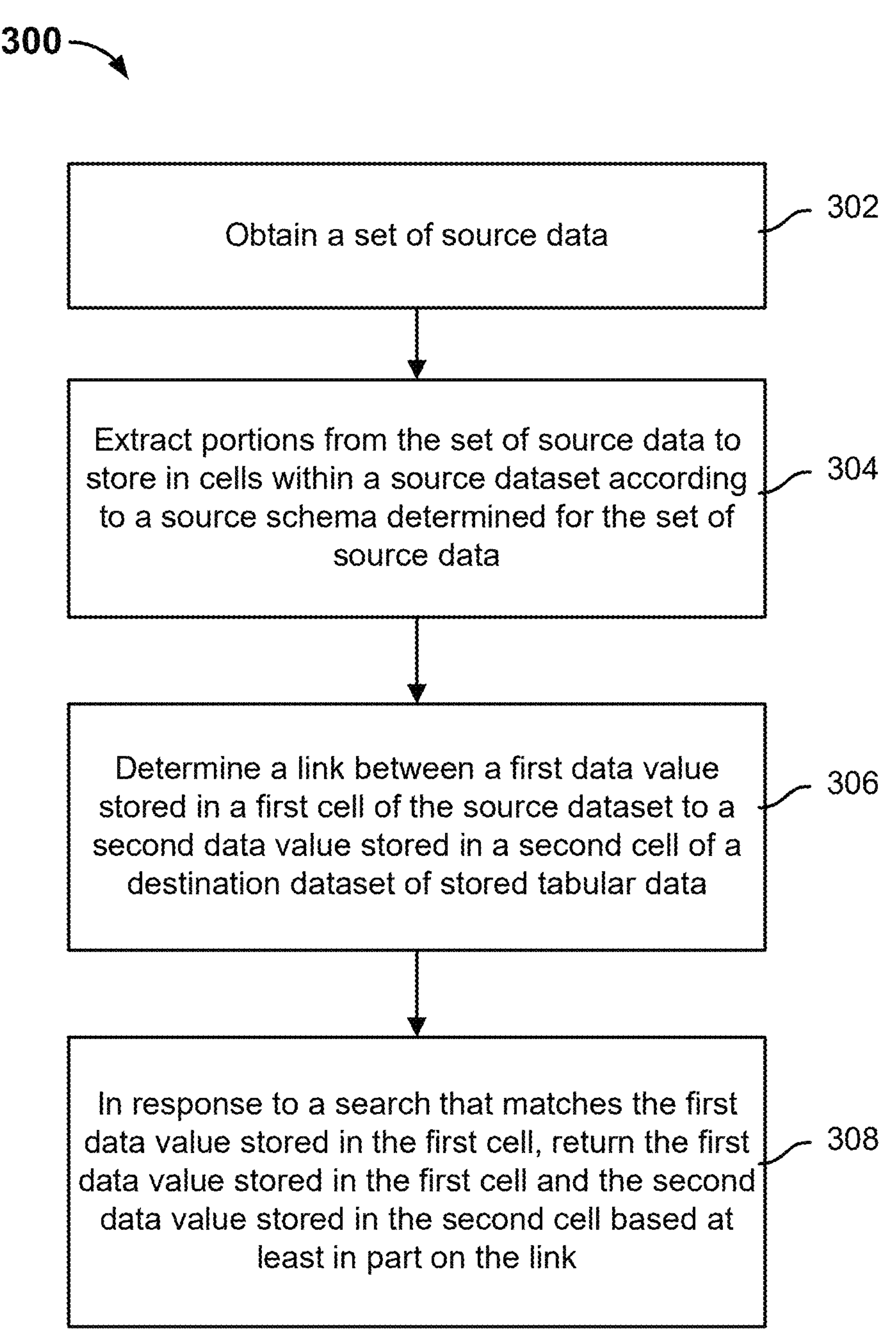
FIG. 3 is a flow diagram showing an embodiment of a process for detecting links among tabular data.

FIG. 3 is a flow diagram showing an embodiment of a process for detecting links among tabular data. In some embodiments, process 300 may be implemented at tabular data management server 108 of FIG. 1.

At 302, a set of source data is obtained. The set of source data comprises user provided data and may comprise structured and/or unstructured data. The set of source data may be obtained via a user interface and/over an API. In some embodiments, the set of source data is obtained along with a user provided description of the data and/or user provided definitions of column fields for a dataset (e.g., table) in which to store the source data.

At 304, portions from the set of source data are extracted to store in cells within a source dataset according to a source schema determined for the set of source data. The schema of the source dataset (e.g., table) that is to be built for the source data is determined based on the user provided description of the data, the user provided definitions of column fields, and by inferring properties of the data. In some embodiments, properties of the data are inferred by prompting an LLM to provide candidate column names for the schema of the source table. After the schema of the source table is determined, the source table is populated with rows of data that are extracted from the set of source data in accordance with the schema of the source table.

At 306, a link is determined between a first data value stored in a first cell of the source dataset and a second data value stored in a second cell of a destination dataset of stored tabular data. The data value(s) stored in cells and/or rows of the source table are then programmatically evaluated against the data values stored in counter cells and/or rows of each of one or more candidate destination datasets (e.g., tables) that are already stored to determine whether the compared data values are linked by one or more types of links. As mentioned above, a "link" refers to a type of relationship/connection/proximity between a pair of sets of data values. In some embodiments, the data value(s) in one cell or one row of the source table may be linked to the data value(s) of zero or more respective cells or rows in one or more destination tables. Information that describes the detected links between data values in a pair of tables is stored.

At 308, in response to a search that matches the first data value stored in the first cell, the first data value stored in the first cell and the second data value stored in the second cell based at least in part on the link are returned. Subsequent to detecting link(s) that connect the data value(s) in a first cell of the source table to the data value(s) in a second cell in a destination table, when the data value(s) of the first cell match a query, then the data value(s) in the second cell in the destination table are returned as a response to the query in addition to the matching data value(s) from the first cell by virtue of the link that connects the first cell and the second cell in their respective tables. In some embodiments, in addition to returning the linked data value(s) from the first and second cells, the description of the type of link between the two cells is also returned as part of the response to the query.

FIG. 4 is a flow diagram showing an example of a process for ingesting source data in accordance with some embodiments. In some embodiments, process 400 may be implemented (e.g., as a software-based AI agent) at tabular data management server 108 of FIG. 1. In some embodiments, steps 302 and 304 of process 300 may be implemented, at least in part, using process 400.

At 402, user provided target column definitions are received. The target column definitions include descriptions of the data and proposed column names for the source table to be built to store portions of the source data.

At 404, a prompt to an LLM is generated to cause the LLM to analyze the set of source data to infer candidate column names. A prompt is generated to include the source data and also a request to the LLM for the LLM to analyze the source data and infer/extract candidate column names for the source table to be built from the source data.

At 406, a normalized schema for a new source table corresponding to the set of source data is determined based on mappings between the user provided target column definitions and the candidate column names. The user provided target column definitions and the candidate column names provided by the LLM are merged to determine a normalized schema for the source table. In some embodiments, the user provided target column definitions and the candidate column names provided by the LLM may include duplicate column names and so a second prompt is generated to request the LLM to remove the duplicate column names among the superset of column names among the user provided target column definitions and the candidate column names provided by the LLM and also to transform/map the remaining candidate column names to the user provided target column definitions. The resulting mapping of candidate column names to the user provided target column definition forms the normalized schema of the source table and describes the names of the columns to be used for the source table as well as the description of data to be stored under each such column.

At 408, the new source table is populated with rows of data extracted from the set of source data in accordance with normalized schema. In some embodiments, once the normalized schema has been determined, a prompt is generated to the LLM to request the LLM to extract rows of data from the set of source data in accordance with the normalized schema to store in the source table to complete the building of the source table.

Figure 5A:
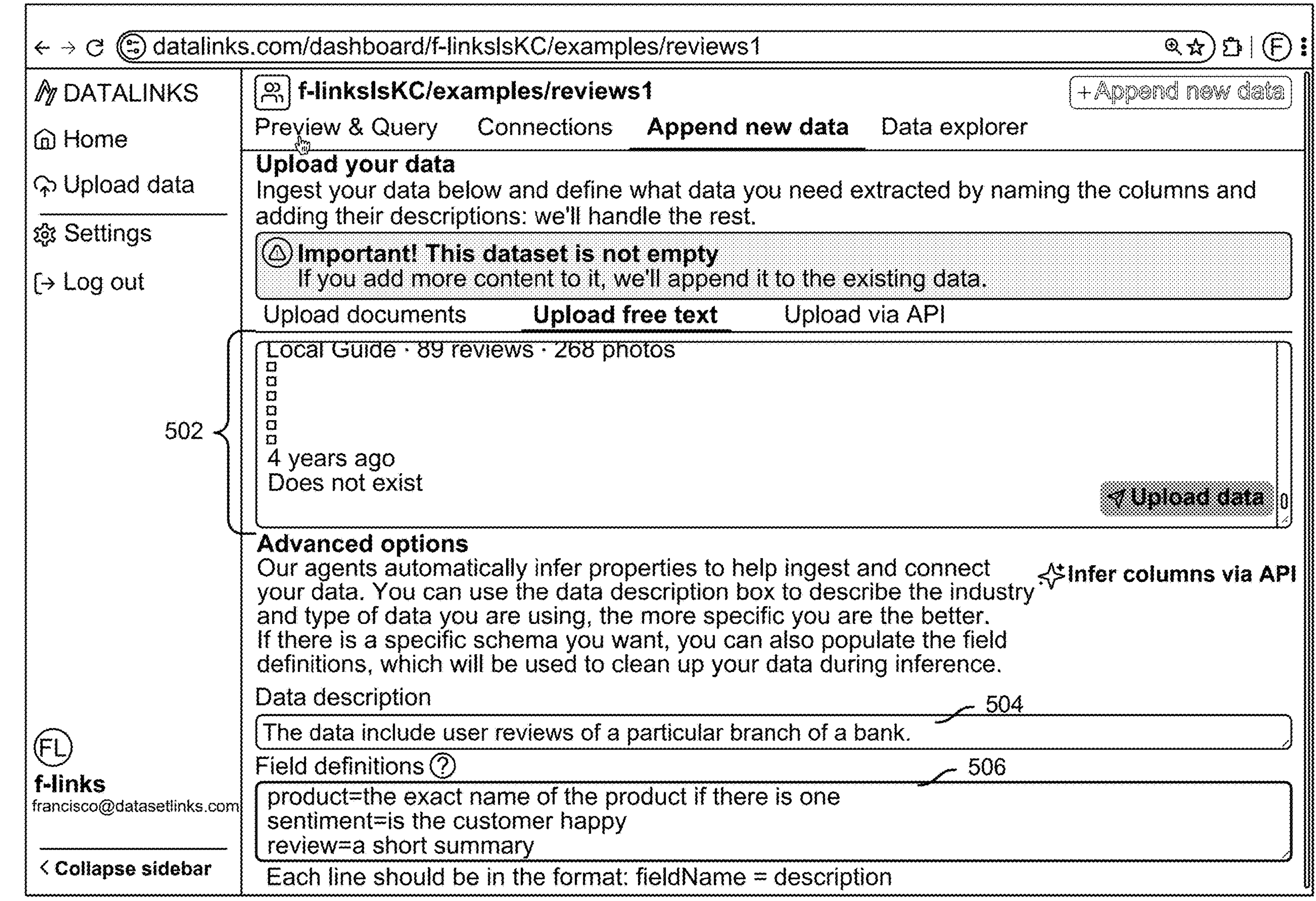
FIG. 5A shows an example user interface through which a user can provide/submit source data to be ingested by the tabular data management server.

FIGS. 5A and 5B are example user interfaces for ingesting source data in accordance with some embodiments. In some embodiments, the user interfaces shown in FIGS. 5A and 5B may be output at a client device by tabular data management server 108 of FIG. 1.

FIG. 5A shows an example user interface through which a user can provide/submit source data to be ingested by the tabular data management server. In the example user interface of FIG. 5A, the user copied free text source data into input area 502 to submit the source data. While not shown in the example of FIG. 5A, the user could additionally/alternatively submit source data by uploading documents or submitting data over the API. In the example user interface of FIG. 5A, the user typed in a description of the source data in input area 504 and also typed in proposed column fields/names and column descriptions in input area 506. In the specific example of FIG. 5A, the user provided target column names include "product," "sentiment," and "review." After submitting the source data and user provided column definitions via the example user interface of FIG. 5A, the source data is ingested, a normalized schema is determined, and a source table is built (e.g., using a process such as process 400 of FIG. 4).

FIG. 5B shows an example user interface that presents a source table that was built from the ingested source data that was submitted over the example user interface of FIG. 5A. In the example of FIG. 5B, the determined normalized schema of the source data comprises the columns of: sentiment, product, and review (which correspond to the user provided proposed column fields/names). FIG. 5B shows the populated/built source table that includes these three columns and the table is populated with rows of data extracted from the source data and where each row of data comprises data under each column that pertains to a single review from the source data. As mentioned above, the data value(s) in each cell of each row of the source table may be directly extracted from the source data or inferred from the source data. In the example source table of FIG. 5B, values under the column "sentiment" may have been inferred from the portion of the source data related to a corresponding review while the values under the columns "Product" and "review" may have been extracted directly from the text of the source data.

While not shown in FIG. 5B, links between cells/rows of the source table of FIG. 5B and the respective cells/rows of other/destination tables may be determined and stored. Data within the source table as well as any associated links to data stored in other tables can be queried by the user via a question they can enter at input area 508 of the example user interface of FIG. 5B.

Figure 6:
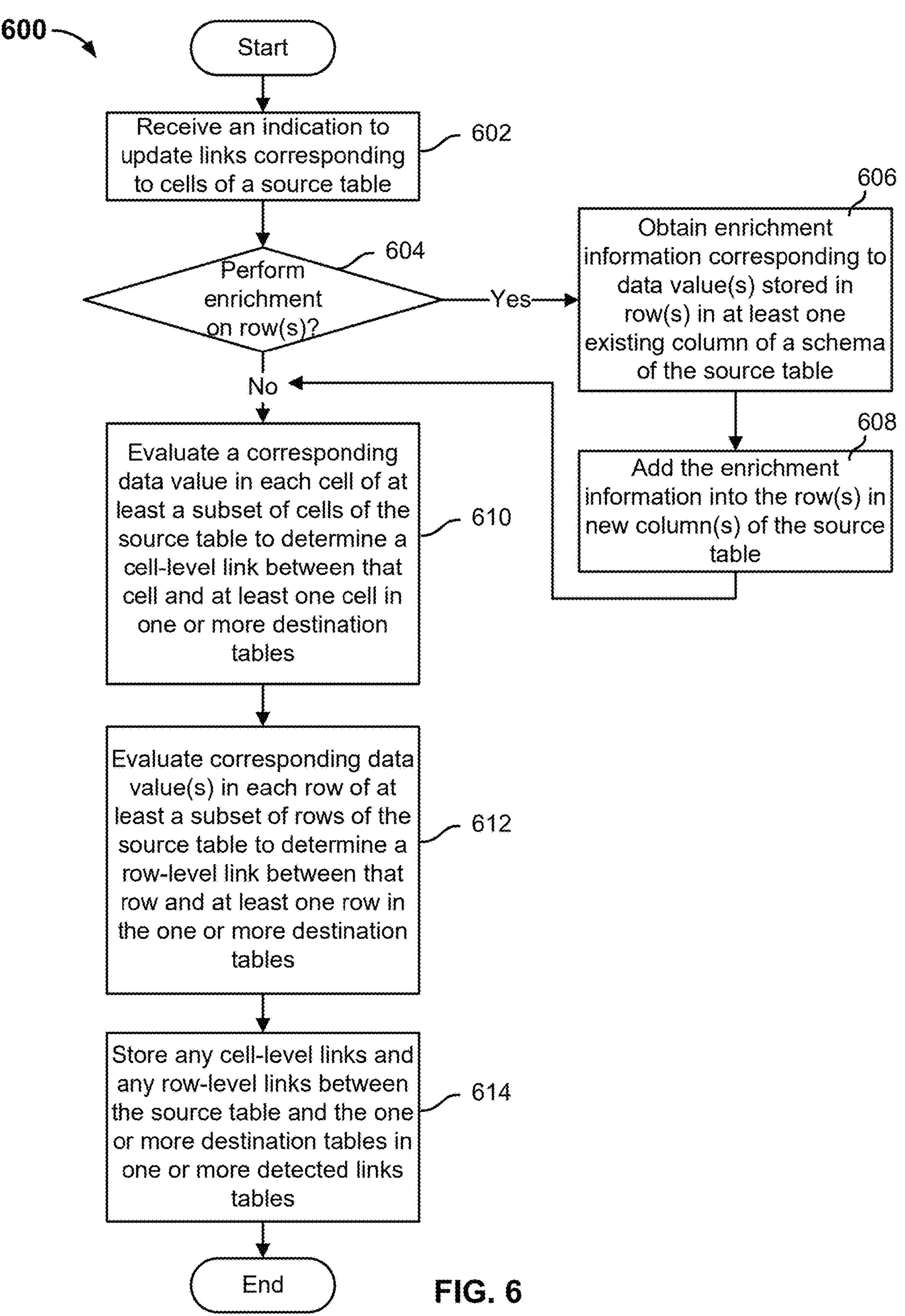
FIG. 6 is a flow diagram showing an example of a process for detecting links between a source table and destination tables in accordance with some embodiments.

FIG. 6 is a flow diagram showing an example of a process for detecting links between a source table and destination tables in accordance with some embodiments. In some embodiments, process 600 may be implemented (e.g., as a software-based AI agent) at tabular data management server 108 of FIG. 1. In some embodiments, step 306 of process 300 may be implemented, at least in part, using process 600.

At 602, an indication to update links corresponding to cells of a source table is received. In some embodiments, the source table was derived from source data uploaded during an ingestion process using a process such as process 400 of FIG. 4. In some embodiments, the links between portions (e.g., cells, rows) of a source table and each of one or more candidate destination tables are detected after the source table is built, periodically and/or in response to an event (e.g., a user initiated request to update the links relative to the source table). In some embodiments, the destination tables (e.g., other tables that are stored by the tabular data management server) that are "candidate" destination tables against which potential links are detected relative to a source table are tables that meet a configurable set of criteria. For example, this configurable set of criteria may include conditions such that a destination table is associated with a permission that allows the data of the source table (given its attributes) to be compared against the data of the destination table and the destination table is associated with a category or other attribute that matches/corresponds to a category or other attribute associated with the source table. For example, the configurable set of criteria can be used to limit the number of destination tables against which to compare against a given source table (e.g., to the subset of destination tables that are more probable to share links with the source table) to make the link detection process more efficient.

At 604, whether enrichment is to be performed on row(s) of the source table is determined. In the event that enrichment is to be performed on row(s) of the source table, control is transferred to 606. Otherwise, in the event that enrichment is not to be performed on row(s) of the source table, control is transferred to 610. In some embodiments, prior to performing link detection between the source table and any destination tables, enrichment is performed on the source table to add data under one or more new, predefined columns to the source table. The new columns of enriched information in the source table can then be used during subsequent link detection.

At 606, enrichment information corresponding to data value(s) stored in row(s) in at least one existing column of a schema of the source table is obtained. In some embodiments, the data to be added to a row in a new, predefined enrichment column in the source table is determined based on existing data from non-enrichment columns in that same row. A first example type of a new enrichment column is GPS data, which can be derived for a row in the source table based on identifying location data (e.g., a street, a city, a state) stored in an existing column of the source table's schema and then querying a GPS location determination service to the obtain a representative GPS coordinate corresponding to that location data. A second example type of a new enrichment column is taxonomy information, which can be derived for a row in the source table based on identifying an entity (e.g., a business, a person, an event) stored in an existing column of the source table's schema and then prompting an LLM to provide a set of taxonomy information corresponding to that entity.

At 608, the enrichment information is added into the row(s) in new column(s) of the source table. Each type of enrichment information that is determined based on the data of a given row of the source table is stored in a corresponding new column in that same row.

At 610, a corresponding data value in each cell of at least a subset of cells of the source table is evaluated to determine a cell-level link between that cell and at least one cell in one or more destination tables. The data value(s) stored in each (of at least some) individual cells are evaluated against the counter data value(s) of individual cells of candidate destination tables to determine whether a cell-level link of one or more types exists between the compared cells of the pairs of tables. Examples of detecting cell-level links are described in FIGS. 7-10, below.

At 612, corresponding data value(s) in each row of at least a subset of rows of the source table is evaluated to determine a row-level link between that row and at least one row in the one or more destination tables. The data value(s) stored in one or more cells of (at least some) rows are evaluated against the counter data value(s) of one or more cells of rows of candidate destination tables to determine whether a row-level link of one or more types exists between the rows of the pairs of tables. Examples of detecting row-level links are described in FIGS. 11-17, below.

At 614, any cell-level links and any row-level links between the source table and the one or more destination tables are stored in one or more detected links tables. The existence of any links between portions (e.g., cells, rows) of a source table and counter portions (e.g., cells, rows) of any destination tables as well as the types of links are stored in detected links tables. In some embodiments, statistics related to the type of detected links and their types between each pair of source and destination tables are stored as well. The number and/or types of detected links between a pair of source and destination tables provide an overview of the degree and nature of connection(s) between the two tables.

Figure 7:
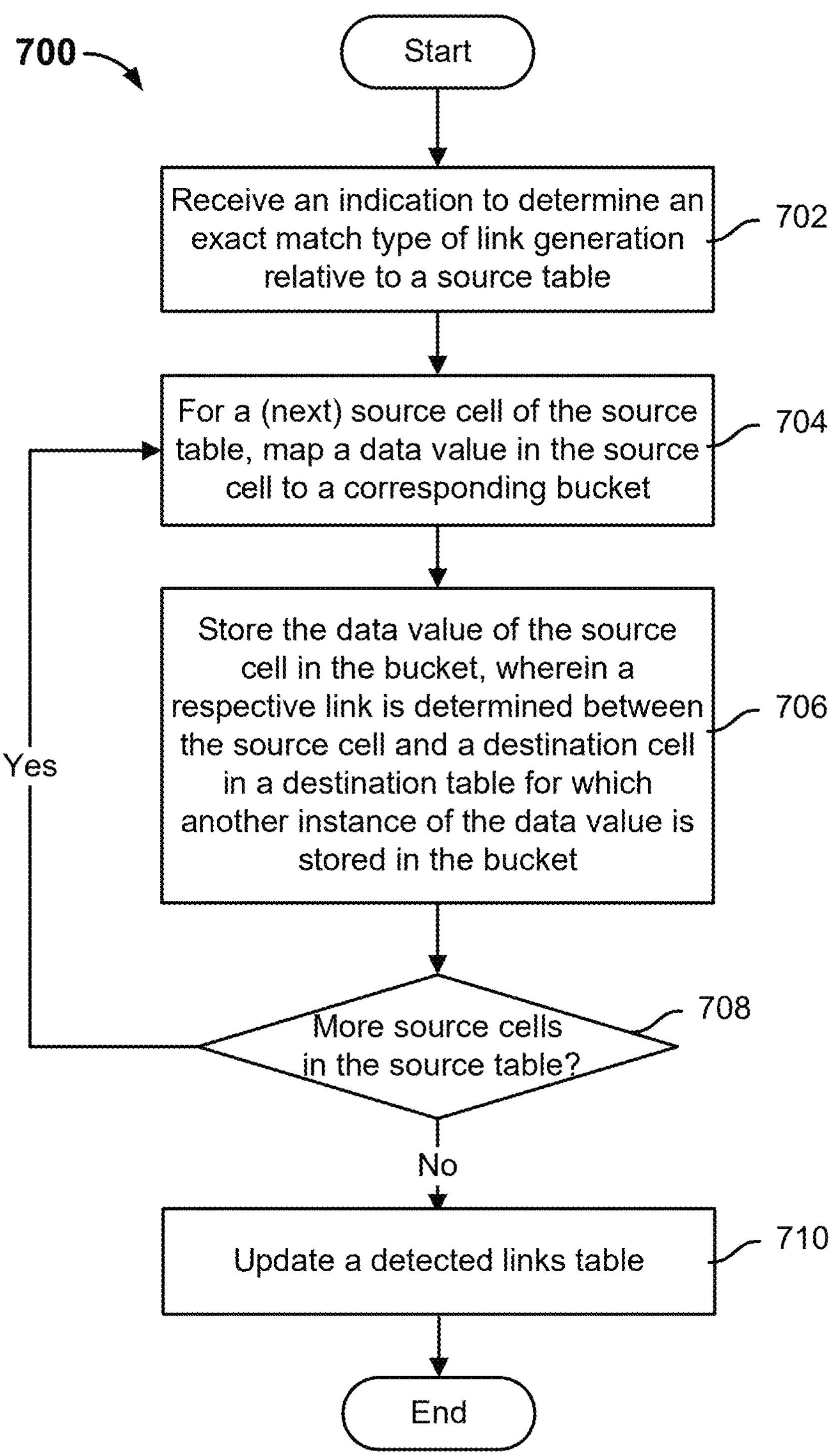
FIG. 7 is a flow diagram showing an example of a process for detecting an exact match type of cell-level link between cells in a source table and cells in destination tables in accordance with some embodiments.

FIG. 7 is a flow diagram showing an example of a process for detecting an exact match type of cell-level link between cells in a source table and cells in destination tables in accordance with some embodiments. In some embodiments, process 700 may be implemented at tabular data management server 108 of FIG. 1. In some embodiments, steps 610 and 614 of process 600 may be implemented, at least in part, using process 700.

At 702, an indication to determine an exact match type of link generation relative to a source table is received. An exact match type of link between two cells is found when the data value of one cell exactly matches the data value of another cell. Put another way, cells in different tables share an exact match type of link when the cells store identical copies of the same data value.

At 704, for a (next) source cell of the source table, a data value in the source cell is mapped to a corresponding bucket. In some embodiments, to determine exact match types of links, a hash table (which is sometimes referred as an "exact match link index") is maintained. For example, the hash table may be implemented using a distributed hash table (e.g., Redis hashes) or a simple index (e.g., PostgreSQL). For example, this hash table uses a hash function to map a data value from a cell to a corresponding value or bucket that stores identifying information of each cell that stores an exact copy of that data value. In some embodiments, the data value of the current source cell under consideration from the source table is first compared against a set of exact match criteria to determine whether it should even be evaluated for an exact match with other cells. For example, the set of exact match criteria can describe that if the data value is a number, then it will not be evaluated for an exact match against other cells (e.g., because exactly matching numbers may not themselves be a meaningful connection since numbers can be associated with many disparate types of information).

At 706, the data value of the source cell is stored in the bucket, wherein a respective link is determined between the source cell and a destination cell in a destination table for which an instance of the data value is stored in the bucket. If the data value from the current source cell under consideration from the source table should be evaluated for an exact match with other cells, then the data value is input into the hash function of the hash table and mapped to a corresponding bucket. Identifying information of the current source cell under consideration from the source table is then stored in that bucket. For example, the identifying information of the current source cell identifies the source table, the relevant column, and/or the row in which the cell appears.

By virtue of being mapped to the same bucket of the hash table, any cells for which identifying information have been stored in that bucket share exactly matching data values or rather, copies of the same data value. Another way to describe it is any two cells for which identifying information has been stored in the same bucket of the hash table and therefore, an exact match link is detected between those two cells.

At 708, whether there is at least one more source cell in the source table is determined. In the event that there is at least one more source cell in the source table, control is returned to 704. Otherwise, in the event that there are no more source cells in the source table, control is transferred to 710. In some embodiments, every cell in the source table that matches the set of exact match criteria is evaluated against the hash table.

At 710, a detected links table is updated. In some embodiments, the detected links table stores information related to detected links between pairs of tables. In one example, the detected links table stores for each pair of tables (e.g., one source table and one destination table), the number of links and types thereof detected between the pair of tables. After exact match links are detected between cells of the source table and cells of other destination tables, the detected links table is updated to reflect the additional links and their types and the pair of source/destination tables to which they pertain.

FIG. 8 shows an example of detecting cell-level exact match links between a pair of tables in accordance with some embodiments. In the example of FIG. 8, the individual cells of the table titled "CompanyHQ" were evaluated against the table titled "CompanyCEO" using a process such as process 700 of FIG. 7 to determine whether exact matches existed between cell values. For example, the data value of "Phord" in the first row under the column of "Company Name" of the table titled "CompanyHQ" was input as a key into a hash function that mapped the data value to a corresponding bucket of the hash table. In the example of FIG. 8, this hash table is represented as the "ExactMatch Link Index," which stores various data values as keys and the values/buckets to which they map. Each bucket of the "ExactMatch Link Index" stores the identifying information of the one or more cells of origin of the corresponding data value. As shown in FIG. 8, because the same data value of "Phord" appears in a cell in the "Company Name" column of the table titled "CompanyHQ" and in a cell in the "Company Name" column of the table titled "Company-CEO," the identifying information of these two cells are both stored in the bucket of the hash table corresponding to key of "Phord." As such, the tables titled "CompanyHQ" and "CompanyCEO" share at least the exact match link between their respective cells that store the data value of "Phord." While not shown in FIG. 8, the existence of this link and potentially other links between this pair of tables can also be stored in a detected links table. FIG. 18, below, shows an example of a detected links table.

Figure 9:
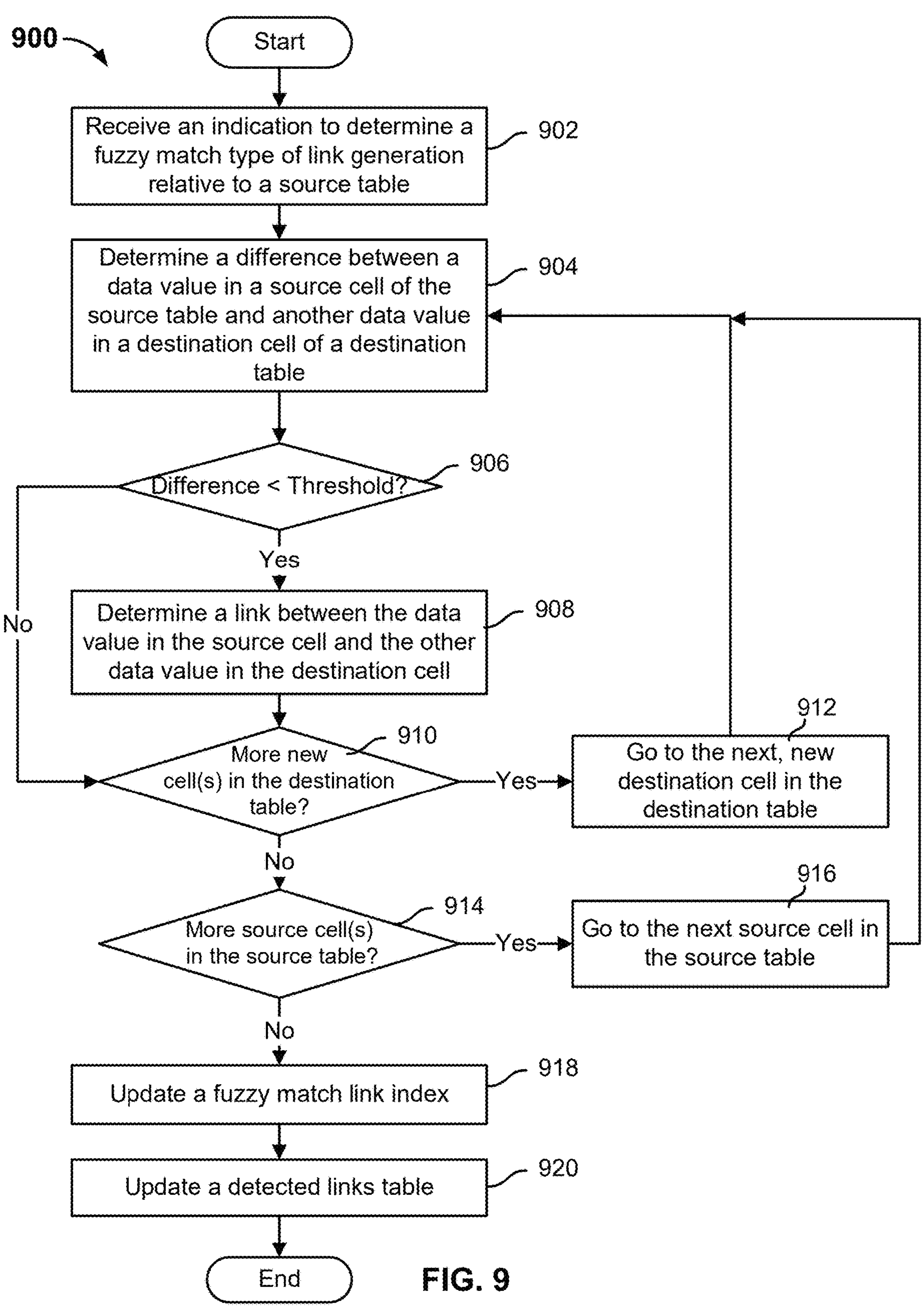
FIG. 9 is a flow diagram showing an example of a process for detecting a fuzzy match type of cell-level link between cells in a source table and cells in destination tables in accordance with some embodiments.

FIG. 9 is a flow diagram showing an example of a process for detecting a fuzzy match type of cell-level link between cells in a source table and cells in destination tables in accordance with some embodiments. In some embodiments, process 900 may be implemented at tabular data management server 108 of FIG. 1. In some embodiments, steps 610 and 614 of process 600 may be implemented, at least in part, using process 900.

Process 900 describes an example process of detecting potential cell-level fuzzy links between a source table and a destination table. Process 900 can be repeated for different pairs of source and destination tables.

At 902, an indication to determine a fuzzy match type of link generation relative to a source table is received. A fuzzy match type of link between two cells is found when the data value of one cell is not identical but more than a threshold of similar to the data value of another cell. Put another way, cells in different tables share a fuzzy match type of link when the cells store sufficiently similar versions of a data value.

At 904, a difference between a data value in a source cell of the source table and another data value in a destination cell of a destination table is determined. In some embodiments, the source cell data value and the destination cell data value are first compared against a set of fuzzy exact match criteria to determine whether they should even be evaluated for a fuzzy match against each other. For example, the set of fuzzy match criteria can describe that if the two data values share an exact match (are identical), then they will not be evaluated for a fuzzy match against each other because they are already linked via an exact match.

In the event that the source cell data value to the destination cell data value should be evaluated for a fuzzy match, the Levenshtein distance (or sometimes referred to as the "edit distance") between the two data values is determined. The Levenshtein distance refers to the number of insertions, deletions, and substitutions needed to convert the source cell data value to the destination cell data value.

At 906, whether the difference is less than a threshold is determined. In the event that the difference is less than a threshold, control is transferred to 908. Otherwise, in the event that the difference is equal to or greater than a threshold, control is transferred to 910. The configurable threshold represents a tolerance for a degree of difference between the data values that should still be considered to be fuzzy matches. Fuzzy matching of data values can group/link together data values even if a subset thereof includes slight misspellings or alternative spellings and/or data values that overlap in text or substantially share the same root words.

At 908, a link between the data value in the source cell and the other data value in the destination cell is determined. The source cell and the destination cell are determined to be linked by virtue of the fuzzy match between their respective data values.

At 910, whether there is at least one more new destination cell in the destination table is determined. In the event that there is at least one more new destination cell in the destination table, control is returned to 912. Otherwise, in the event that there are no more new destination cells in the source table, control is transferred to 914. A destination cell is "new" relative to the current source cell of the source table. Therefore, the data value of the same destination cell can be compared to the data values of different source cells because the destination cell would be "new" relative to each source cell.

At 912, the next, new destination cell in the destination table that is to be evaluated next is identified and the process is returned to 904.

At 914, whether there is at least one more source cell in the source table is determined. In the event that there is at least one more source cell in the source table, control is returned to 916. Otherwise, in the event that there are no more source cells in the source table, control is transferred to 918.

At 916, the next source cell in the source table that is to be evaluated next is identified and the process is returned to 904.

At 918, a fuzzy match link index is updated. A fuzzy match link index tracks cells across pairs of source/destination tables that store fuzzy matching data values and that are therefore linked by a cell-level fuzzy match link.

At 920, a detected links table is updated. After fuzzy match links are detected between cells of the source table and cells of other, destination tables, the detected links table is updated to reflect the additional links and their types and the pair of source/destination tables to which they pertain.

Figure 10:
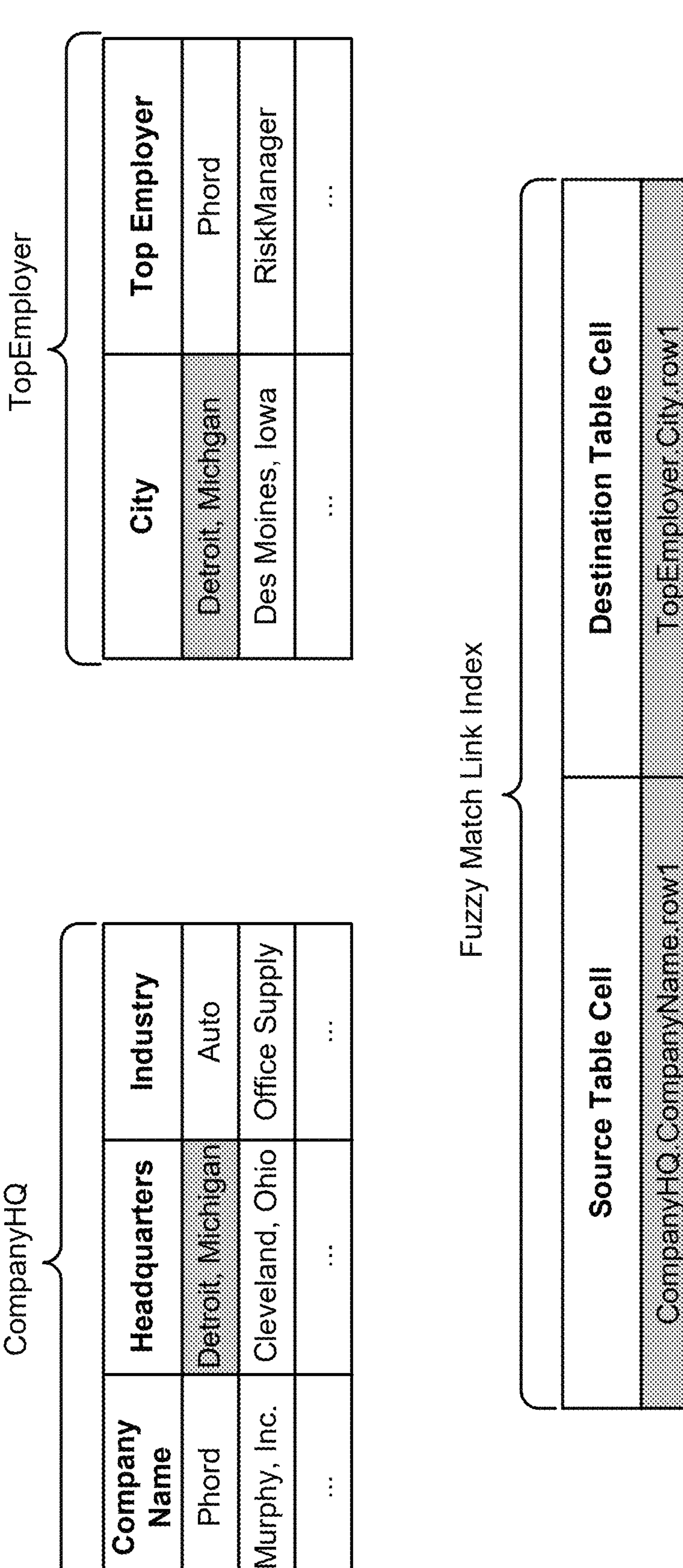
FIG. 10 shows an example of detecting cell-level fuzzy match links between a pair of tables in accordance with some embodiments.

FIG. 10 shows an example of detecting cell-level fuzzy match links between a pair of tables in accordance with some embodiments. In the example of FIG. 10, the individual cells of the table titled "CompanyHQ" were evaluated against the cells of the table titled "TopEmployer" using a process such as process 900 of FIG. 9 to determine whether fuzzy matches existed between cell values. For example, the data value of "Detroit, Michigan" in the first row under the column of "Headquarters" of the table titled "CompanyHQ" was compared against the data value in each cell of the table titled "TopEmployer." A difference (e.g., a Levenshtein distance) was determined between "Detroit, Michigan" and the counter data value in a cell of the table titled "TopEmployer." Because the difference between "Detroit, Michigan" in the table titled "CompanyHQ" and the "Detroit, Michgan" (which includes a misspelling of the state of "Michigan") in the first row under the column of "City" of the table titled "TopEmployer" was less than a threshold (because the latter data value included a slight misspelling of "Michigan"), the two cells were determined to be linked by a fuzzy match. As such, a "Fuzzy Match Link Index" has been updated to identify that cells storing "Detroit, Michigan" in the "CompanyHQ" table and storing "Detroit, Michgan" in the "TopEmployer" table are linked by a fuzzy match.

Figure 11:
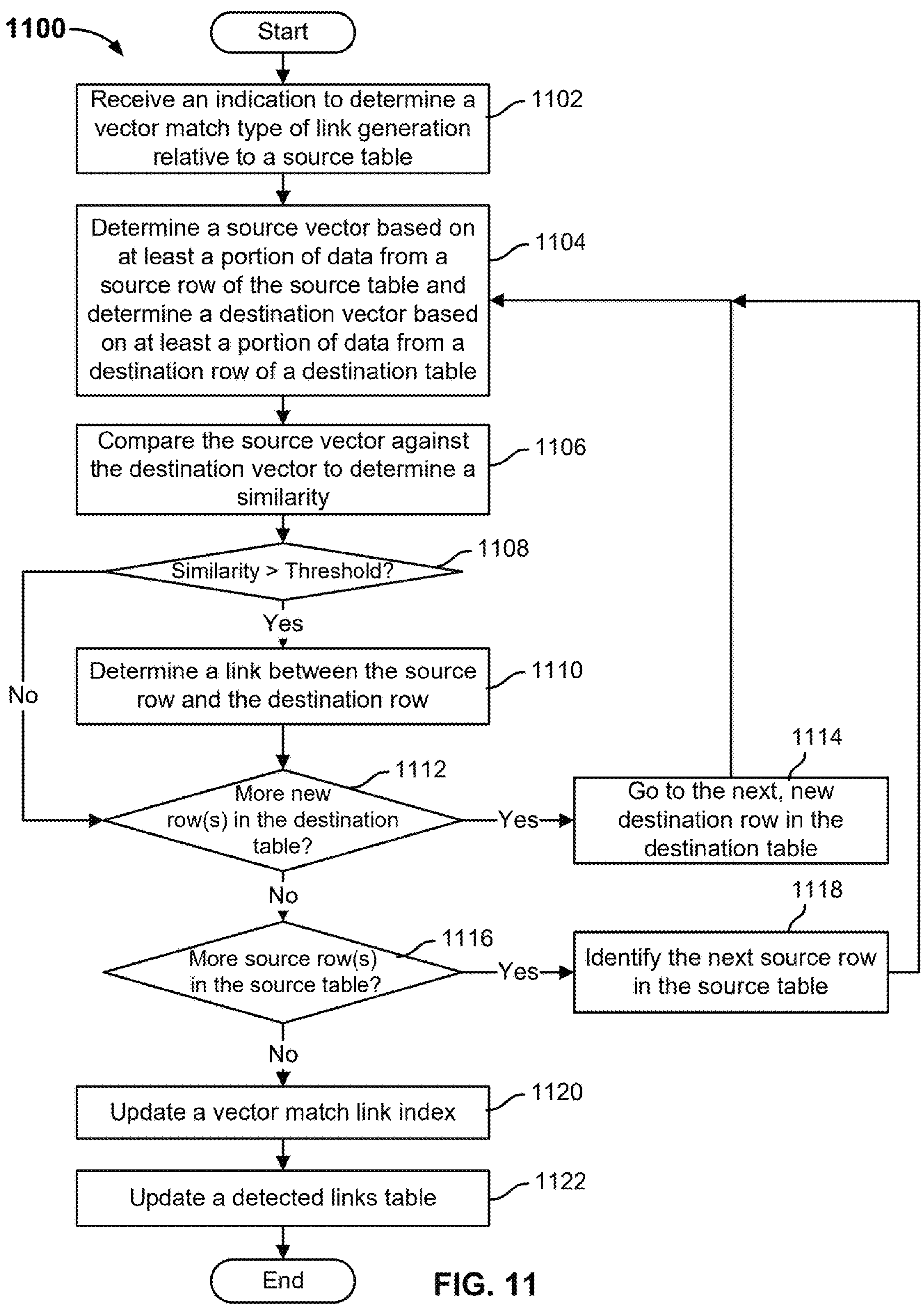
FIG. 11 is a flow diagram showing an example of a process for detecting a vector match type of row-level link between rows in a source table and rows in destination tables in accordance with some embodiments.

FIG. 11 is a flow diagram showing an example of a process for detecting a vector match type of row-level link between rows in a source table and rows in destination tables in accordance with some embodiments. In some embodiments, process 1100 may be implemented at tabular data management server 108 of FIG. 1. In some embodiments, steps 612 and 614 of process 600 may be implemented, at least in part, using process 1100.

Process 1100 describes an example process of detecting potential row-level vector links between a source table and a destination table. Process 1100 can be repeated for different pairs of source and destination tables.

At 1102, an indication to determine a vector match type of link generation relative to a source table is received. A vector match type of link between two rows is found when a vector that is derived from at least some of the data values of one row has more than a threshold degree of similarity to a vector that is derived from at least some of the data values of a counter row. In some embodiments, a vector that is generated from at least some of the data values of one row comprises an embedding with points in a continuous vector that represents that row in a vector representation. Put another way, rows in different tables share a vector match type of link when their respective vectors are sufficiently similar.

At 1104, a source vector is determined based on at least a portion of data from a source row of the source table and a destination vector is determined based on at least a portion of data from a destination row of a destination table. In some embodiments, the data values stored in a predetermined set (e.g., all) of columns in the source table are obtained in a predetermined order (e.g., the order in which the columns appear in the source table) and then converted into a vector-based embedding (e.g., using a model for translating a set of text information into a vector)—the "source" vector. In some embodiments, the data values stored in a predetermined set (e.g., all) of columns in the destination table are obtained in a predetermined order (e.g., the order in which the columns appear in the destination table) and then converted into a vector-based embedding (e.g., using a model for translating a set of text information into a vector)—the "destination" vector. In some embodiments, the source vector and the destination vector are generated to include the same number of dimensions.

At 1106, the source vector and the destination vector are compared to determine a similarity. Example techniques for determining similarities between vectors include cosine similarity and determining an Euclidean distance.

At 1108, whether the similarity is greater than a threshold is determined. In the event that the similarity is greater than a threshold, control is transferred to 1110. Otherwise, in the event that the similarity is equal to or less than the threshold, control is transferred to 1112. The configurable threshold represents a tolerance for a degree of similarity between the vectors that should still be considered to be matches. Matching of vectors that represent the data values stored in respective rows can group/link together rows with data values that are similar in vector space.

At 1110, a link is determined between the source row and the destination row.

At 1112, whether there is at least one more new destination row in the destination table is determined. In the event that there is at least one more new destination row in the destination table, control is returned to 1114. Otherwise, in the event that there are no more new destination rows in the source table, control is transferred to 1116. A destination row is "new" relative to the current source row of the source table. Therefore, the same destination row can be compared to different source rows because the destination row would be "new" relative to each source row.

At 1114, the next, new destination row in the destination table that is to be evaluated next is identified and the process is returned to 1104.

At 1116, whether there is at least one more source row in the source table is determined. In the event that there is at least one more source row in the source table, control is returned to 1118. Otherwise, in the event that there are no more source rows in the source table, control is transferred to 1120.

At 1118, the next source row in the source table that is to be evaluated next is identified and the process is returned to 1104.

At 1120, a vector match link index is updated. A vector match link index tracks rows across pairs of source/destination tables that are linked by a row-level vector match link. At 1122, a detected links table is updated. After vector match links are detected between rows of the source table and rows of other, destination tables, the detected links table is updated to reflect the additional links and their types and the pair of source/destination tables to which they pertain.

FIG. 12 shows an example of detecting row-level vector match links between a pair of tables in accordance with some embodiments. In the example of FIG. 12, the rows of the table titled "CompanyHQ" were evaluated against the rows of the table titled "CompanyCEO" using a process such as process 1100 of FIG. 11 to determine whether matching vectors (e.g., embeddings) representing rows existed between different tables. For example, the set and sequence of data values in the first row of the table titled "CompanyHQ" ("Phord," "Detroit, Michigan," "Auto") were converted into a first vector (e.g., [$v_{s11}$, $v_{s12}$, $v_{s13}$ . . . ]). The set and sequence of data values in the second row of the table titled "CompanyHQ" ("Murphy, Inc.," "Austin, Texas," "Office Supply") were converted into a second vector (e.g., [$v_{s21}$, $v_{s22}$, $v_{s23}$ . . . ]). The set and sequence of data values in the first row of the table titled "CompanyCEO" ("LA Fit," "Cleveland, Ohio," "Alice Pom") were converted into a third vector (e.g., [$v_{d11}$, $v_{d12}$, $v_{d13}$ . . . ]). The set and sequence of data values in the second row of the table titled "CompanyCEO" ("Phord," "Detroit, Michigan," "John Smith") were converted into a fourth vector (e.g., [$v_{d21}$, $v_{d22}$, $v_{d23}$ . . . ]). Each of the row-level vectors (the first and second vectors) of the "CompanyHQ" table are compared to each of the row-level vectors (the third and fourth vectors) to determine respective pairwise vector similarities. In this specific example, assume that only the pairwise vector similarity between the first vector (representing the first row of the table titled "CompanyHQ") and the fourth vector (representing the second row of the table titled "CompanyCEO") were sufficiently similar and as such, these two rows are determined to be linked by a vector match. As such, a "Vector Match Link Index" has been updated to identify that these two rows are linked by a vector match.

Figure 13:
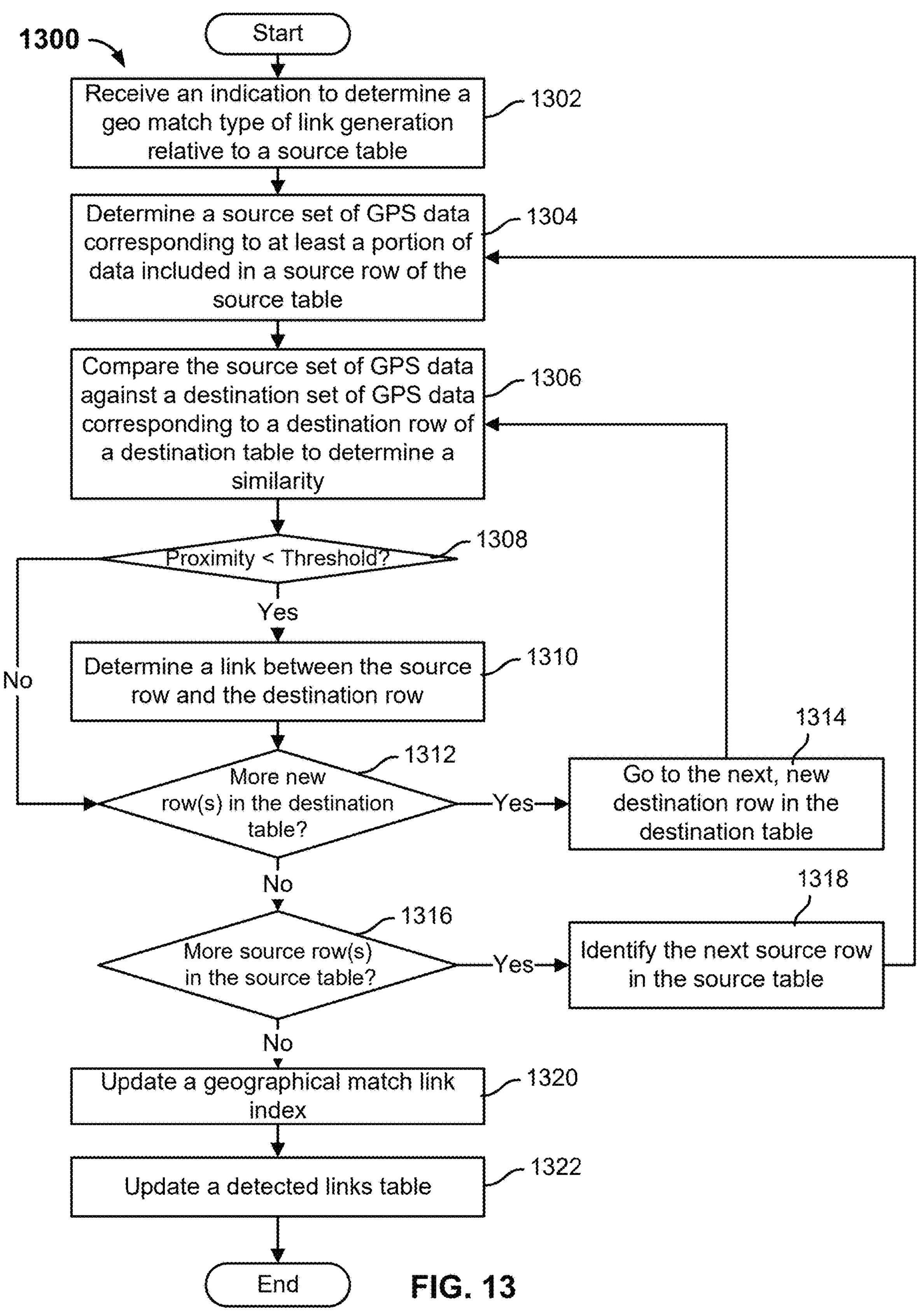
FIG. 13 is a flow diagram showing an example of a process for detecting a geographical match type of row-level link between rows in a source table and rows in destination tables in accordance with some embodiments.

FIG. 13 is a flow diagram showing an example of a process for detecting a geographical match type of row-level link between rows in a source table and rows in destination tables in accordance with some embodiments. In some embodiments, process 1300 may be implemented at tabular data management server 108 of FIG. 1. In some embodiments, steps 612 and 614 of process 600 may be implemented, at least in part, using process 1300.

Process 1300 describes an example process of detecting potential row-level geographical match links (which are sometimes referred to as "geolinks") between a source table and a destination table. Process 1300 can be repeated for different pairs of source and destination tables.

At 1302, an indication to determine a geographical match type of link generation relative to a source table is received. A geographical match type of link between two rows is found when a set of GPS data that is derived from data in a row has more than a threshold degree of similarity to a set of GPS data that is derived from data in a counter row. Put another way, rows in different tables share a geographical match type of link when they include GPS data that is sufficiently proximate.

At 1304, a source set of GPS data corresponding to at least a portion of data included in a source row of the source table is determined. In some embodiments, data related to a location (e.g., a city, a state, a branch of a store, an address) in each row is identified. For example, data in a row related to a location can be inferred from its column name. In a specific example, if a column name of a row includes a column name that is inferred to include location data, then a set of GPS data corresponding to/representative of that location is determined and added to the row in a new column for GPS data, such as, for example, during the enrichment process (e.g., as described in steps 606 and 608 of process 600 of FIG. 6).

At 1306, the source set of GPS data is compared against a destination set of GPS data corresponding to a destination row of a destination table to determine a proximity. For example, the source set of GPS data that represents a location associated with the source row is compared to the destination set of GPS data that represents a location associated with the destination row and a distance/proximity between the sets of GPS data is determined.

At 1308, whether the proximity is less than a threshold is determined. In the event that the proximity is less than a threshold, control is transferred to 1310. Otherwise, in the event that the proximity is greater than or equal to the threshold, control is transferred to 1312. The configurable threshold represents a tolerance for a degree of proximity between the locations associated with the source and destination rows that should still be considered to be geolinked. In some embodiments, the GPS data associated with the source and destination rows may be compared using Elasticsearch Geoindexes. Matching of rows that are associated with sufficiently proximate GPS data can group/link together rows with location type data values that are geographically close.

At 1310, a link is determined between the source row and the destination row.

At 1312, whether there is at least one more new destination row in the destination table is determined. In the event that there is at least one more new destination row in the destination table, control is returned to 1314. Otherwise, in the event that there are no more new destination rows in the source table, control is transferred to 1316. A destination row is "new" relative to the current source row of the source table. Therefore, the same destination row can be compared to different source rows because the destination row would be "new" relative to each source row.

At 1314, the next, new destination row in the destination table that is to be evaluated next is identified.

At 1316, whether there is at least one more source row in the source table is determined. In the event that there is at least one more source row in the source table, control is returned to 1318. Otherwise, in the event that there are no more source rows in the source table, control is transferred to 1320.

At 1318, the next source row in the source table that is to be evaluated next is identified.

At 1320, a geographical match link index is updated. A geographical match link index tracks rows across pairs of source/destination tables that are linked by a row-level geographical match link.

At 1322, a detected links table is updated. After geographical match links are detected between rows of the source table and rows of other, destination tables, the detected links table is updated to reflect the additional links, their types, and the pair of source/destination tables to which they pertain.

Figure 14:
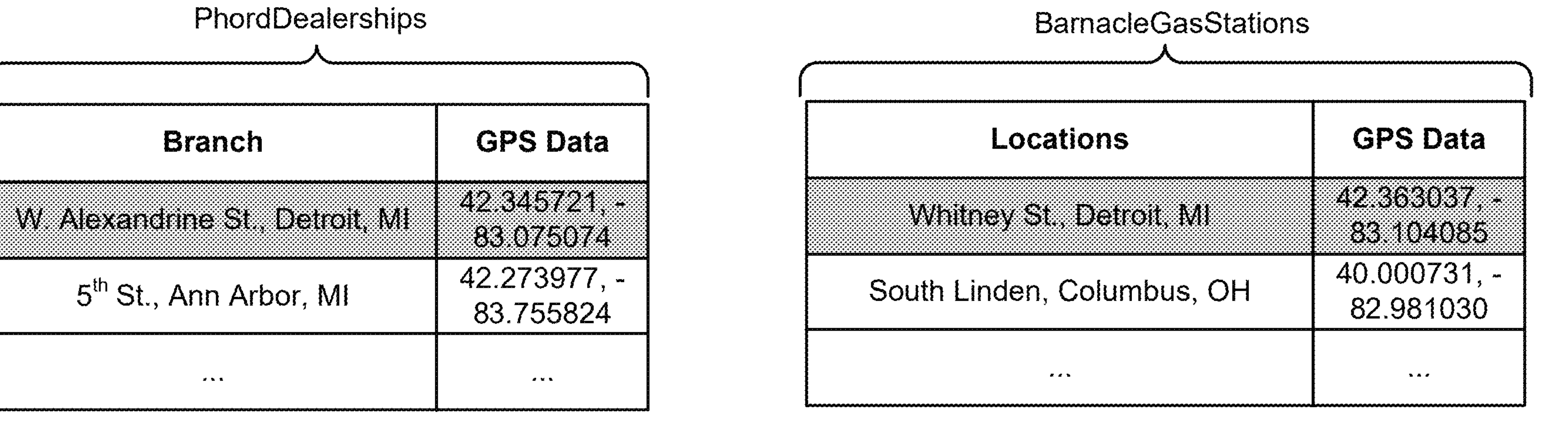
FIG. 14 shows an example of detecting row-level geographical match links between a pair of tables in accordance with some embodiments.

FIG. 14 shows an example of detecting row-level geographical match links between a pair of tables in accordance with some embodiments. In the example of FIG. 14, GPS data columns were added to each of the table titled "PhordDealerships" and the table titled "BarnacleGasStations." For example, the "GPS Data" column was added to the table titled "PhordDealerships" and populated with a set of GPS coordinates that was determined based on the Phord Dealership branch that was identified in the same row (e.g., during a process of adding enrichment information to the table). For example, the "GPS Data" column was added to the table titled "BarnacleGasStations" and populated with a set of GPS coordinates that was determined based on the Barnacle gas station branch that was identified in the same row (e.g., during a process of adding enrichment information to the table). The GPS data of each row of the table titled "PhordDealerships" was evaluated against the GPS data of each row of the table titled "BarnacleGasStations" using a process such as process 1300 of FIG. 13 to determine whether the rows between different tables were geolinked (e.g., whether the compared sets of GPS data were sufficiently proximate). In this specific example, assume that the GPS data (42.345721,-83.075074) in the first row of the table titled "PhordDealerships" corresponding to the "W. Alexandrine St., Detroit, MI" location was sufficiently proximate to GPS data (42.363037,-83.104085) in the first row of the table titled "BarnacleGasStations" corresponding to the "Whitney St., Detroit, MI" location and as such, these two rows are determined to be geographically linked. As such, a "Geographical Match Link Index" has been updated to identify that these two rows are linked by a geographical match.

Figure 15:
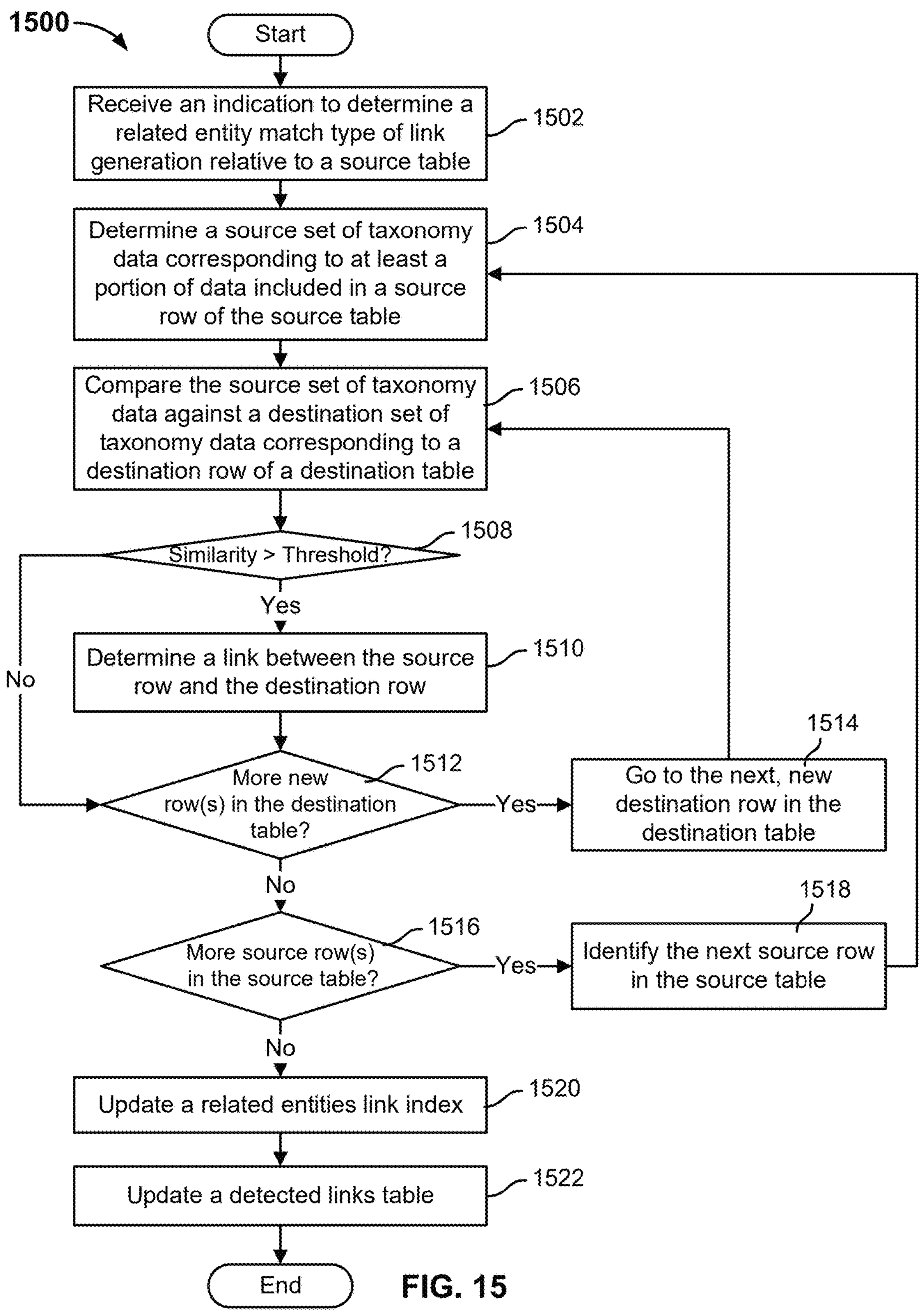
FIG. 15 is a flow diagram showing an example of a process for detecting a related entity type of row-level link between rows in a source table and rows in destination tables in accordance with some embodiments.

FIG. 15 is a flow diagram showing an example of a process for detecting a related entity type of row-level link between rows in a source table and rows in destination tables in accordance with some embodiments. In some embodiments, process 1500 may be implemented at tabular data management server 108 of FIG. 1. In some embodiments, steps 612 and 614 of process 600 may be implemented, at least in part, using process 1500.

Process 1500 describes an example process of detecting potential row-level related entity links between a source table and a destination table. Process 1500 can be repeated for different pairs of source and destination tables.

At 1502, an indication to determine a related entity type of link generation relative to a source table is received. A related entity type of link between two rows is found when the data value(s) of one row are "related" to at least a portion of the data value(s) of another row. How two rows are "related" can be defined in one or more ways. In a first example, two rows can be related if a subject identified in one row encompasses/affects/controls a subject in another row. Specifically, the subject in a first row can be a regulation and the subject in a second, related row can be an entity that is governed by the regulation. In a second example, a set of taxonomy data (e.g., category information) that is derived from entity data in a row has more than a threshold degree of similarity to a set of taxonomy data that is derived from entity data in a counter row. Specifically, rows in different tables share a related entity type of link when they include taxonomy data that are sufficiently proximate, as is shown in the example of process 1500.

At 1504, a source set of taxonomy data corresponding to at least a portion of data included in a source row of the source table is determined. In some embodiments, data is related to an entity (e.g., a person, a place, a store, or another subject) in each row. For example, entity data in a row can be inferred from their column name. In a specific example, if a column name of a row includes a column name that is inferred to include entity data, then a set of taxonomy data corresponding to/representative of that entity is determined (e.g., by prompting an LLM to provide the taxonomy data associated with the determined entity in a predetermined format) and added to the row in a new column for taxonomy data, such as, for example, during the enrichment process (e.g., as described in steps 606 and 608 of process 600 of FIG. 6).

At 1506, the source set of taxonomy data is compared against a destination set of taxonomy data corresponding to a destination row of a destination table to determine a similarity. For example, the source set of taxonomy data that describes one or more categories associated with the identified entity in the source row is compared to the destination set of taxonomy data that describes one or more categories associated with the identified entity in the destination row and a similarity between the taxonomies is determined.

At 1508, whether the similarity is greater than a threshold is determined. In the event that the similarity is greater than a threshold, control is transferred to 1510. Otherwise, in the event that the similarity is equal to or less than the threshold, control is transferred to 1512. The configurable threshold represents a tolerance for a degree of similarity between the taxonomies associated with the source row and destination row that should still be considered to be related entities. Matching of rows that are associated with sufficiently similar entities can group/link together rows with entities that are "related."

At 1510, a link is determined between the source row and the destination row.

At 1512, whether there is at least one more new destination row in the destination table is determined. In the event that there is at least one more new destination row in the destination table, control is returned to 1514. Otherwise, in the event that there are no more new destination rows in the source table, control is transferred to 1516. A destination row is "new" relative to the current source row of the source table. Therefore, the same destination row can be compared to different source rows because the destination row would be "new" relative to each source row.

At 1514, the next, new destination row in the destination table that is to be evaluated next is identified and the process is returned to 1506.

At 1516, whether there is at least one more source row in the source table is determined. In the event that there is at least one more source row in the source table, control is returned to 1518. Otherwise, in the event that there are no more source rows in the source table, control is transferred to 1520.

At 1518, the next source row in the source table that is to be evaluated next is identified and the process is returned to 1504.

At 1520, a related entities link index is updated. A related entities link index tracks rows across pairs of source/destination tables that are linked by a row-level related entities link.

At 1522, a detected links table is updated. After related entities links are detected between rows of the source table and rows of other, destination tables, the detected links table is updated to reflect the additional links and their types and the pair of source/destination tables to which they pertain.

Figure 16:
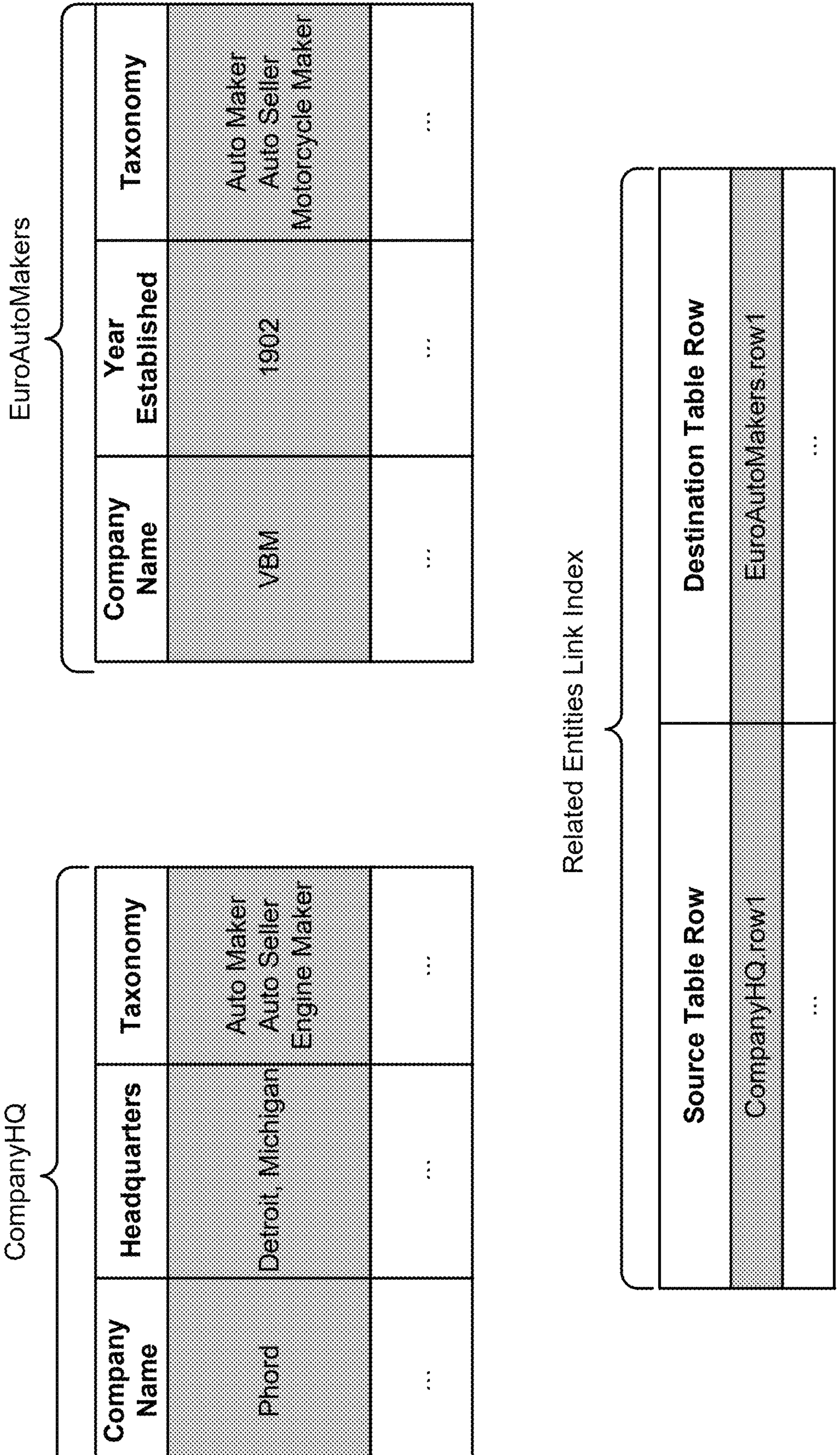
FIG. 16 shows an example of detecting row-level related entities links between a pair of tables in accordance with some embodiments.

FIG. 16 shows an example of detecting row-level related entities links between a pair of tables in accordance with some embodiments. In the example of FIG. 16, taxonomy data columns were added to each of the table titled "CompanyHQ" and the table titled "EuroAutoMakers." For example, the "Taxonomy" column was added to the table titled "CompanyHQ" and populated with a set of taxonomy data comprising three attributes/categories associated with the entity in the company name value that was identified in the same row (e.g., during a process of adding enrichment information to the table). For example, the "Taxonomy" column was added to the table titled "EuroAutoMakers" and populated with a set of taxonomy data comprising three attributes/categories associated with the entity in the company name value that was identified in the same row. The set of taxonomy data of each row of the table titled "CompanyHQ" was evaluated against the GPS data of each row of the table titled "EuroAutoMakers" using a process such as process 1500 of FIG. 15 to determine whether the rows between different tables included related entities (e.g., whether the compared sets of taxonomy data were sufficiently similarity). In this specific example, assume that the taxonomy data ("Auto Maker, Auto Seller, Engine Maker") in the first row of the table titled "CompanyHQ" corresponding to the company name "Phord" was sufficiently similar to the taxonomy data ("Auto Maker, Auto Seller, Motorcycle Maker") in the first row of the table titled "EuroAutoMakers" corresponding to the company name "VBM" and as such, these two rows are determined to be linked as related entities. As such, a "Related Entities Link Index" has been updated to identify that these two rows are linked as related entities.

FIG. 17 is a diagram showing an example of tables for which row-level overlapping windows type of link is determined in accordance with some embodiments. In some embodiments, an overlapping windows type of link between rows in different tables can be determined for flexible scenarios in which a first event denoted in a first row is associated with a first time window that appears to at least partially overlap with a second time window that is associated with a second event denoted in a second row. In a first example, an overlapping windows type of link between rows in different tables can be determined by prompting an LLM to evaluate rows of different tables to determine overlapping windows between two rows in respective tables. In a second example, specific scenarios associated with an overlapping windows type of link between rows in different tables can be inferred/detected based on a customized/manually programmed search for those specific scenarios. The example of detecting an overlapping windows type of link between rows in different tables as described in FIG. 17 pertains to the specific scenario of detecting overlapping time windows of plane-related events. The table titled "AirplaneMaintenance" stores rows of information related to different plane maintenance events at a given airport and the table titled "Flights" stores rows of information related to the times at which specified planes arrive and then depart at the given airport. In one specific example of detecting overlapping windows between rows of the table titled "AirplaneMaintenance" and the rows of the table titled "Flights," a time window or timestamp is first determined for each row of each table. In the table titled "AirplaneMaintenance," each row includes a timestamp at which a corresponding plane maintenance event took place at the airport. In the table titled "Flights," each row includes a specified plane's (the plane is identified by its tail number) arrival time (the time at which the plane is scheduled to land at the airport) and a departure time (the time at which the plane is scheduled to depart from the airport) and so a time window (in which the plane is present at the airport) can be defined by the arrival and departure time. The timestamp of each row from the table titled "AirplaneMaintenance" is then compared to the time window defined for each row from the table titled "Flights" and when a compared pair of timestamps and time windows overlap, then the respective rows are determined to share an overlapping window link. In the example of FIG. 17, the timestamp of "06:00 PM, 2024.05.01" in the second row of the table titled "AirplaneMaintenance" regarding the event of a toilet seat fix was determined to overlap with the time window defined by the arrival time of "04:00 PM, 2024.05.01" and the departure time of "08:00 PM, 2024.05.01," and therefore, the two rows are determined to be linked. As such, the "Overlapping Windows Link Index" has been updated to identify that these two rows are linked by an overlapping windows link match.

FIG. 18 is a diagram showing an example detected links table in accordance with some embodiments. The example "Detected Links Table" shown in FIG. 18 summarizes the number of each type of link that has been detected between pairs of stored tables (e.g., of ingested user provided data and/or data provided by data suppliers) (e.g., using processes such as process 700 of FIG. 7, process 900 of FIG. 9, process 1100 of FIG. 11, process 1300 of FIG. 13, and/or process 1500 of FIG. 15). In particular, the example "Detected Links Table" shown in FIG. 18 includes the columns of "Source Table," "Destination Table," "Link Type," "Hits," and "Applied On." Specifically, the columns of "Source Table" and "Destination Table" identify a pair of tables for which portions (cells and rows) thereof were compared to detect the presence of one or more types of links, the column of "Link Type" describes the type of link that was detected between that pair of tables, the column of "Hits" describes the number of instances of that type of link, and the column of "Applied On" describes whether that type of link was detected at the granularity of "Cells" or "Rows" in the tables. For example, row 1802 of the example "Detected Links Table" shown in FIG. 18 describes that the table titled "SourceTableA" and the table titled "DestinationTable1" share 60 instances of exact match types of links between cells in the table titled "SourceTableA" and cells in the table titled "DestinationTable1." Row 1804 describes that the table titled "SourceTableA" and the table titled "DestinationTable2" share 2 instances of fuzzy match types of links between cells in the table titled "SourceTableA" and cells in the table titled "DestinationTable2." Row 1806 describes that the table titled "SourceTableA" and the table titled "DestinationTable2" share 8 instances of geographical match types of links between rows in the table titled "SourceTableA" and rows in the table titled "DestinationTable2." Row 1808 describes that the table titled "SourceTableA" and the table titled "DestinationTable3" share 32 instances of related entity types of links between rows in the table titled "SourceTableA" and rows in the table titled "DestinationTable3."

In some embodiments, a detected links table can be presented at a user interface in response to a user selection to view links that have been detected between a selected/specified (e.g., source) table and other tables (e.g., for which the selecting user is determined to have permission to view the contents thereof or the links thereof). In some embodiments, the user can select a particular row of the detected links table to view more detailed information on the specific cells and/or rows of a table that are linked to those in a counter table. For example, more detailed information on the specific cells and/or rows of a table that are linked to those in a counter table related to a particular link type may include a portion of link type match index (e.g., such as shown in FIGS. 8, 10, 12, 14, 16, and 17) that includes the corresponding pair of source and destination tables. For example, the example "Detected Links Table" shown in FIG. 18 is generated and presented in response to a user's selection at a user interface to view the links that have been detected relative to the source table identified as "SourceTableA."

Figure 19:
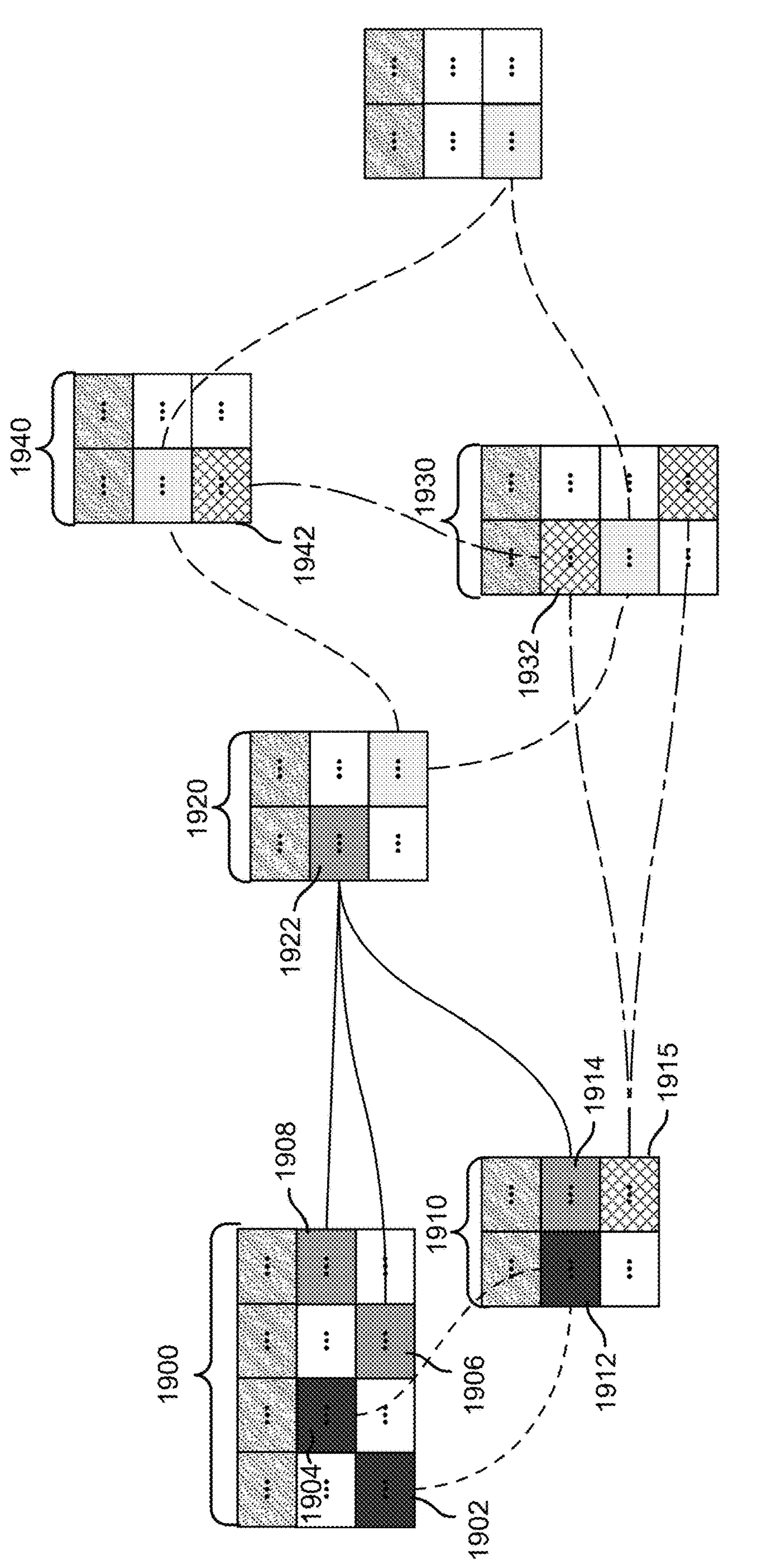
FIG. 19 is a diagram showing an example visualization of links that have been detected among cells located in different tables.

FIG. 19 is a diagram showing an example visualization of links that have been detected among cells located in different tables. In FIG. 19, cells that share links with each other are colored in with the same pattern and are shown to be connected by the same type of line. As illustrated with the example cell-level (e.g., exact match type, fuzzy match type) link visualization in FIG. 19, one cell in a table can be linked to zero or more cells in another table. In a specific example, cell 1912 of table 1910 is linked to cells 1902 and 1904 of table 1900. As illustrated with the example cell-level link visualization in FIG. 19, one cell in a table can be linked to two or more cells in two or more other tables. In a specific example, cell 1922 of table 1920 is linked to cells 1906 and 1908 of table 1900 and cell 1914 of table 1910. As illustrated with the example cell-level link visualization in FIG. 19, a first cell in a first table can be directly linked to a second cell in a second table and indirectly related to a third cell in a third table (where the second cell in the second table is directly linked to the third cell in the third table because, for example, the first cell was not directly compared to the third cell due to the incompatible permissions of the first and third tables). In a specific example, cell 1915 of table 1910 is directly linked to cell 1932 of table 1930, which is then directly linked to cell 1942 of table 1940. As such, cell 1915 of table 1910 is indirectly linked to cell 1942 of table 1940. Put another way, cell 1942 of table 1940 is two links away from cell 1915 of table 1910. In some embodiments and the example as shown in FIG. 19, links between cells are not directional. In some other embodiments, depending on the link type, a link may be directional (e.g., the data in one cell affects/controls the linked data in a different cell but the reverse is not true).

While not shown in FIG. 19, links (e.g., vector match type, geographical match type, related entities match type, overlapping window type) between rows among different tables can be similarly visualized.

Figure 20:
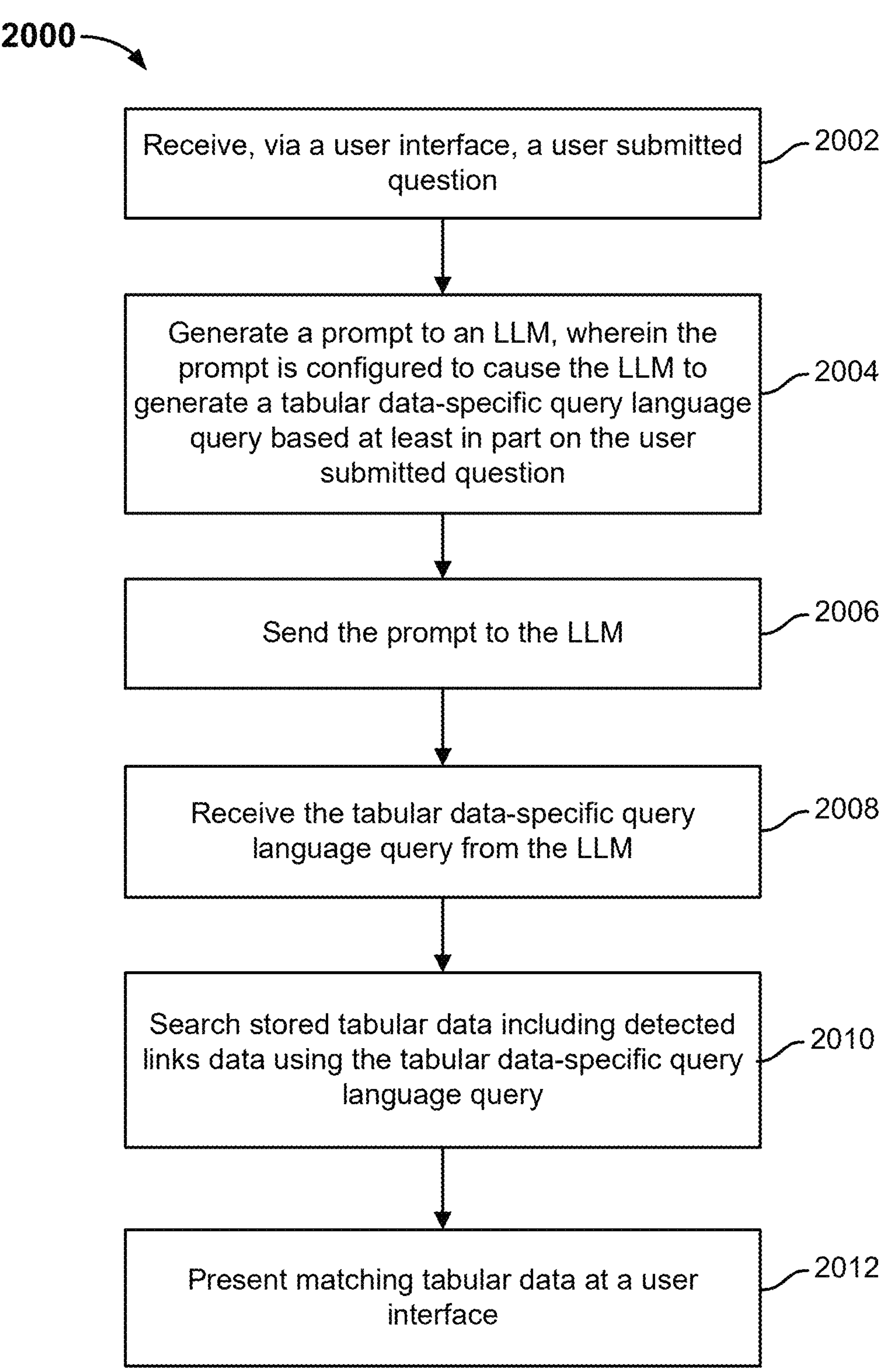
FIG. 20 is a flow diagram showing an example of a process for performing a search against stored tabular data including detected links data in accordance with some embodiments.

FIG. 20 is a flow diagram showing an example of a process for performing a search against stored tabular data including detected links data in accordance with some embodiments. In some embodiments, process 2000 may be implemented at tabular data management server 108 of FIG. 1.

At 2002, a user submitted question is received via a user interface. A user submitted question that is written in natural language query may be received from a user over the user interface. For example, the user that had submitted the question may be the same user or a different user from the one that had uploaded the source data that was ingested (e.g., using a process such as process 400 of FIG. 4) into a source table and for which links were found to other tables. For example, the user submitted question may ask for analysis, trends, predictions, and/or summaries that would be at least informed by or directly answered using at least a portion of the stored tabular data and the detected links within.

At 2004, a prompt to an LLM is generated, wherein the prompt is configured to cause the LLM to generate a tabular data-specific query language query based at least in part on the user submitted question. For example, a prompt to an LLM (e.g., a third-party LLM) that includes the user submitted question and a request for the LLM to generate a query in a (e.g., proprietary) tabular data-specific language to search through the stored tabular data and detected links data for data relevant to the query is generated. For example, to instruct an LLM that has not been fine-tuned to generate queries in the tabular data-specific query language, the generated prompt may include instructions to aid the LLM including one or more of the following: the schema(s) (e.g., the column names and descriptions) of one or more stored tables that can be searched, the grammar that is used by the query language, example queries with correct syntax, and any restrictions on the query language.

At 2006, the prompt is sent to the LLM.

At 2008, the tabular data-specific query language query is received from the LLM. The LLM output query based on the generated prompt is received.

At 2010, stored tabular data including detected links data is searched using the tabular data-specific query language query. The query in the tabular data-specific query language query is then searched against the stored tabular data including detected links data, which has been generated as described above. In various embodiments, running the query against the stored tabular data including detected links data includes identifying a table that matches the query, loading portions (the data values of cells and/or rows) of the table that match the query, identifying links that are associated with the matching portions of the matching table, and loading at least portions of other tables that are connected to the matching portions of the matching table by the identified links.

At 2012, matching tabular data is presented at the user interface. In some embodiments, not only are matching portions of a matching table presented at the user interface but so are the link data (e.g., the link types) that correspond to the matching portions of the matching table as well as the linked-to portions of other tables with which the links are associated. For example, if cell_1 of Table A matched the query, and cell_1 of Table A is linked to cell_3 of Table D by an exact matching type of link, then the following information would be returned at the user information: the data value of cell_1 of Table A, an exact match link type between cell_1 of Table A to cell_3 of Table D, and the data value of cell_3 of Table D.

Figure 21:
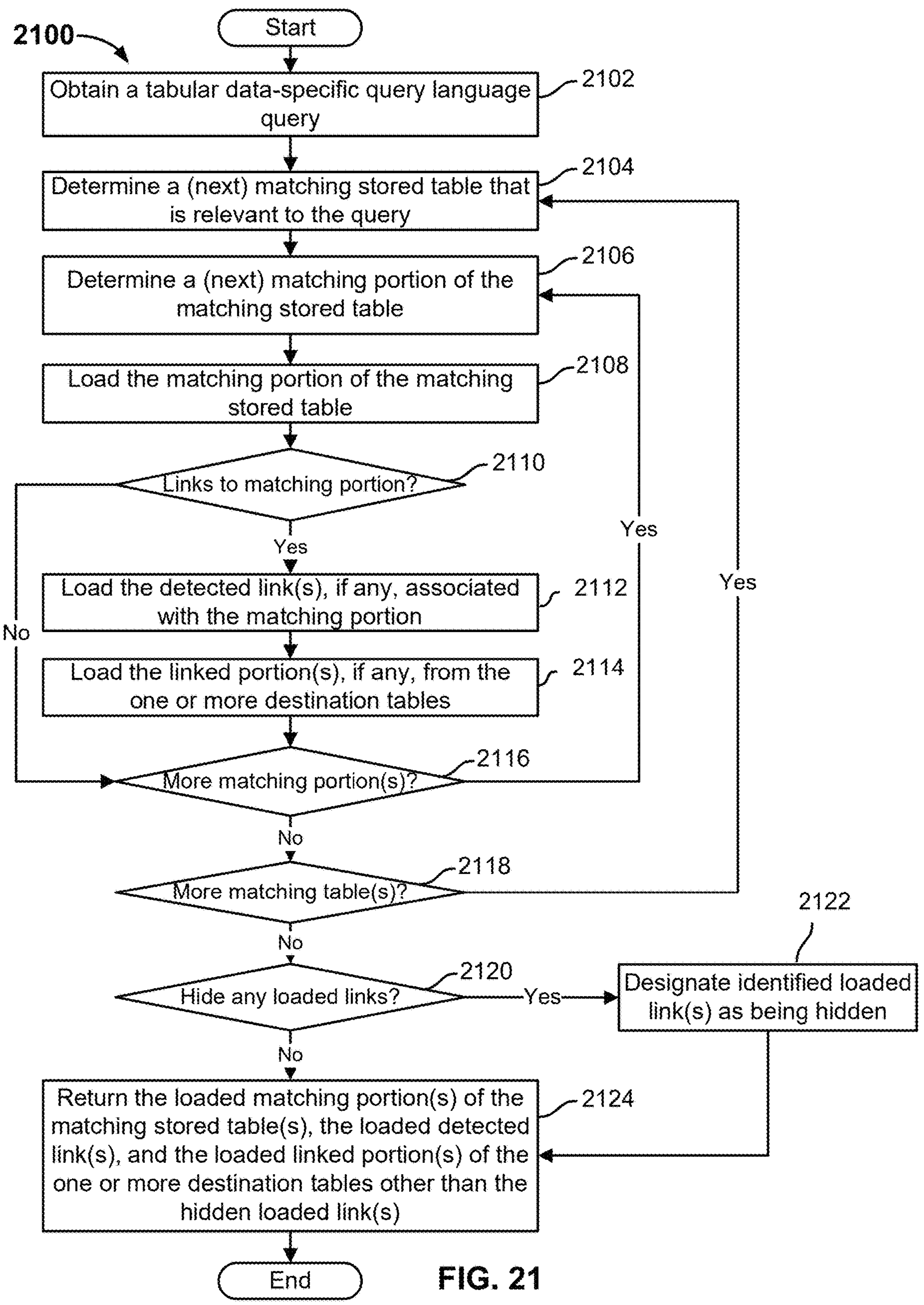
FIG. 21 is a flow diagram showing an example of a process for searching through stored tabular data including detected links data in accordance with some embodiments.

FIG. 21 is a flow diagram showing an example of a process for searching through stored tabular data including detected links data in accordance with some embodiments. In some embodiments, process 2100 may be implemented at tabular data management server 108 of FIG. 1. In some embodiments, step 2010 of process 2000 of FIG. 20 may be implemented, at least in part, on process 2100.

At 2102, a tabular data-specific query language query is obtained. As described in process 2000 of FIG. 20, the tabular data-specific query language query may be output by an LLM in response to a prompt that includes a user submitted question.

In a specific example, the user submitted question is "What are the tariffs on exhaust pipes supplied from Canada to the US?" Based on that user submitted question, the resulting query that is generated by the LLM based on the parameters for the tabular data-specific query language that was included in the prompt is: Object("tariffs").filter(product==exhaust && from==CA && to==US).searchAround(depth=3).find("suppliers"). In this example tabular data-specific query language, different command types (e.g., Object( ) filter( ) searchAround( ) and find( ) are used to perform and limit the search through the stored tabular data).

At 2104, a (next) matching stored table that is relevant to the query is determined. The query is used to identify a stored table that matches the query. Returning to the example query of Object("tariffs").filter(product==exhaust && from==CA && to==US).searchAround(depth=3).find("suppliers"), a matching table might be one whose table/dataset/object identifier matches the term of "tariffs" (as indicated by the Object("tariffs") portion of the query).

At 2106, a (next) matching portion of the matching stored table that is relevant to the query is determined. A matching portion, such as a cell or a row, of the matching stored table is one that matches the word "exhaust" (as indicated by the filter (exhaust) portion of the query).

At 2108, the matching portion of the matching stored table is loaded. The data value(s) of a matching cell or row of the matching stored table is loaded into memory.

At 2110, whether there are any detected links associated with the matching portion is determined. In the event that there is at least one detected link associated with the matching portion, control is transferred to 2112. Otherwise, in the event that there are no detected links associated with the matching portion, control is transferred to 2116. It is determined whether detected links data (e.g., link indices that identify pairs of cells or rows between which links have been detected) indicates that the matching portion (e.g., cell or row) of the matching stored table is linked to one or more counter cells/rows in another, destination table.

At 2112, the detected link(s), if any, associated with the matching portion are loaded. If the matching portion (e.g., cell or row) of the matching stored table is linked to a counter cell/row in another, destination table, then the link type of each such link is loaded into memory.

At 2114, the linked portion(s), if any, from one or more destination tables are loaded. If the matching portion (e.g., cell or row) of the matching stored table is linked to a counter cell/row in another, destination table, then the link type of each such link is loaded along with the data value(s) stored in the linked-to cell/row in the destination table. In some embodiments, if the linked-to cell/row in the destination table is linked to a portion of yet another destination table, then in some embodiments, that link and the subsequently linked-to data value(s) in the yet other destination table is also loaded into memory, and so forth, up until the number of links away from the matching portion of the matching stored table that is specified, if any, in the query. Returning to the example query of Object("tariffs").filter(product==exhaust && from==CA && to==US) searchAround(depth=3).find("suppliers"), the link data and linked-to data values up to three links away from the matching portion of the matching stored table should be loaded into the memory (as indicated by the searchAround(depth=3) portion of the query).

In some embodiments, the number of links away from the matching data in the matching table for a query that is traversed is referred as "depth" and can be determined based on one or more factors. While there is no default limit on the number of links that can be traversed, the number of links that can be traversed relative to the each matching portion (e.g., cell or row) of the matching table can be specified as a parameter in a query (e.g., as a parameter within the searchAround( ) command) or determined (limited based) on heuristics, a prioritization score corresponding to each matching portion or link, and/or traversing links from a predetermined number of matching portions of the matching portion that are ranked highest (e.g., based on prioritization scores).

At 2116, whether there are any more matching portions in the matching stored table is determined. In the event that there is at least one matching portion associated with the matching portion, control is returned to 2106. Otherwise, in the event that there are no more matching portions associated with the matching portion, control is transferred to 2118. After the relevant link data and linked-to data has been loaded for the current matching portion (e.g., cell or row) of the matching stored table, it is determined whether there is another matching portion (e.g., cell or row) of the matching stored table for loaded linked data.

At 2118, whether there are any more matching stored tables that are relevant to the query is determined. In the event that there is at least one matching stored table that is relevant to the query, control is returned to 2104. Otherwise, in the event that there are no more matching stored tables that are relevant to the query, control is transferred to 2120. After all of the matching portions (e.g., cells and/or rows) of the matching stored table have been considered, it is determined whether there is another stored table for which to determine matching portions thereof.

At 2120, whether any loaded links should be hidden is determined. In the event that there is at least one loaded link that should be hidden, control is transferred to 2122. Otherwise, in the event that there are no loaded links that should be hidden, control is transferred to 2124. Given that the number of loaded links that pertain to the matching portion (s) of the matching stored table can quickly balloon, in some embodiments, the loaded links and linked-to/referenced data values are first evaluated to determine whether at least a subset of them should be hidden and therefore, suppressed from being returned to the user (or a downstream service) as matching data to the given query. For example, links that are determined to be weaker (e.g., do not represent a strong connection or probable connection between the connected data values/cells/rows) may be excluded/hidden from being returned as matching data. A first example criterion for determining which links to hide are links between exact matches of data values that include only numbers and this is because matching numbers may still represent disparate categories of information (e.g., address and birthdays). A second criterion for determining which links to hide is links that are associated with lower confidence levels ("metadata scores"). For example, detected links may be assigned confidences based on their degrees of match/similarity/proximity and as such, it may be determined if the number of links that are associated with a matching portion of the matching stored table is greater than a threshold, then only links with confidence levels above a given confidence threshold are maintained (e.g., not hidden).

At 2122, identified loaded link(s) are designated as hidden. Those links that have met the criteria for being hidden are designated as such. For each link that is hidden, the data values that the link points to in a destination table (and any subsequent links) are also hidden from being returned as matching data to the query.

At 2124, the loaded matching portion(s) of the matching stored table(s), the loaded detected link(s), and the loaded linked-to portion(s) of the one or more destination tables other than the hidden loaded link(s) are returned. The matching portions of the matching stored table(s) are returned as matching data. Additionally, each type of link (that has not been designated as being hidden), if any, that links each matching portion of a matching storage table to a counter portion in a destination table is also returned in the matching data, along with the linked-to data value(s) of the linked counter portion in each destination table. In some embodiments, if the linked portions of the destination table (relative to the matching stored data) are themselves determined to be linked to yet another destination table, those link(s) and the linked-to data values of the linked counter portions in the yet other destination tables can also be returned in the matching data, and so forth, up to a specified depth in the query. For example, each series of nodes of data/portion tables and their associated links in the matching data may be referred to as a "path."

In some embodiments, returned matching data (inclusive of matching tabular data and the associated linked data) may be returned to the searching user at a user interface. In some embodiments, the matching data may not be presented at a user interface but passed to a downstream service, as will be described in FIG. 22, below.

Figure 22:
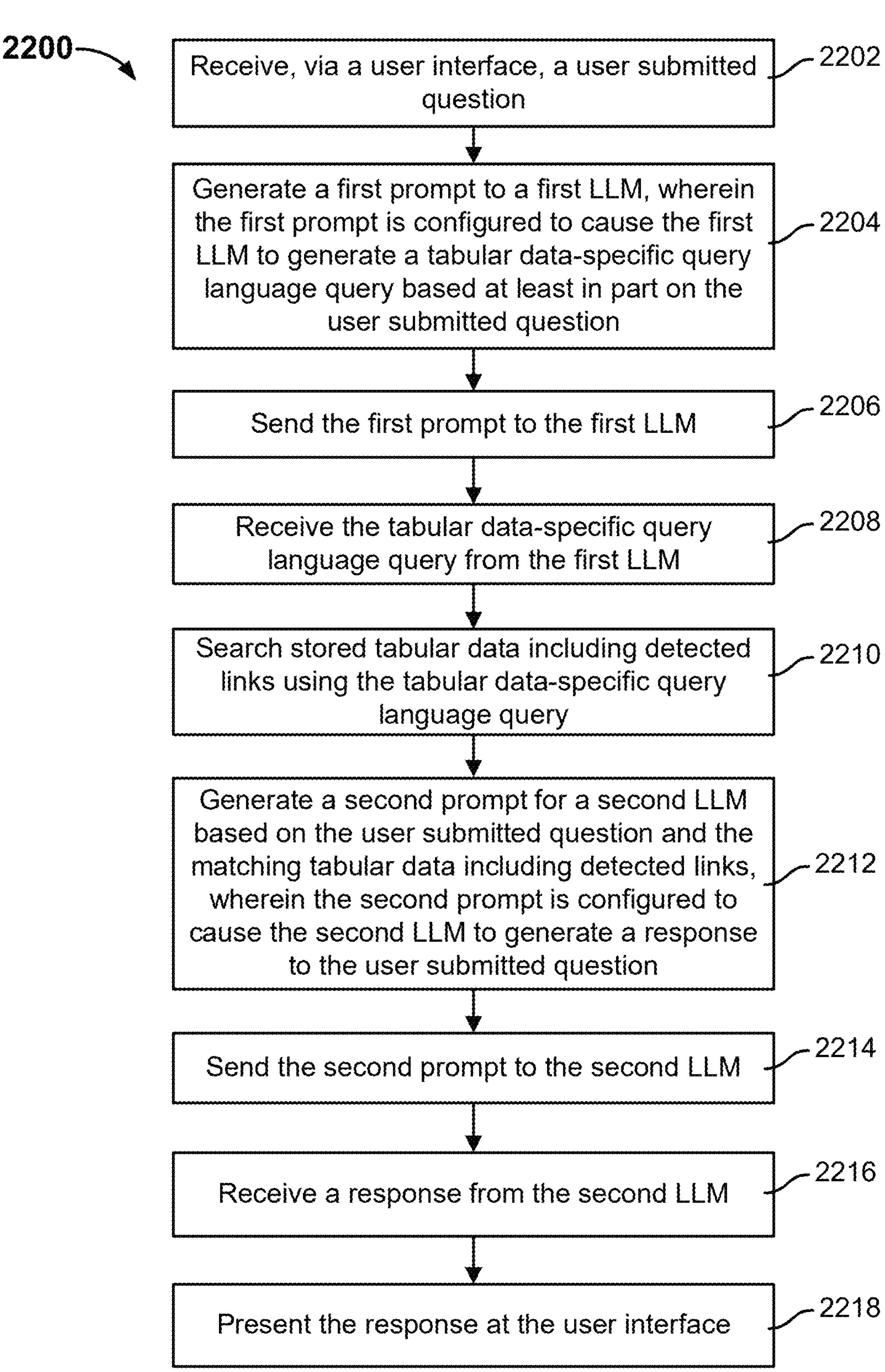
FIG. 22 is a flow diagram showing an example of a process for performing a search against stored tabular data including detected links data and passing the matching tubular data to a downstream LLM in accordance with some embodiments.

FIG. 22 is a flow diagram showing an example of a process for performing a search against stored tabular data including detected links data and passing the matching tubular data to a downstream LLM in accordance with some embodiments. In some embodiments, process 2200 may be implemented at tabular data management server 108 of FIG. 1.

Process 2200 is similar to process 2000 of FIG. 20 but whereas process 2000 returns the matching tabular data to a query to the user at a user interface, process 2200 formats and passes the matching tabular data as context into a downstream LLM.

At 2202, a user submitted question is received via a user interface.

At 2204, a first prompt to a first LLM is generated, wherein the first prompt is configured to cause the first LLM to generate a tabular data-specific query language query based at least in part on the user submitted question.

At 2206, the first prompt is sent to the first LLM.

At 2208, the tabular data-specific query language query is received from the first LLM. The LLM output query based on the generated prompt is received.

At 2210, stored tabular data including detected links data are searched using the tabular data-specific query language query. For example, the query is searched against the stored tabular data in a process such as process 2100 of FIG. 21.

At 2212, a second prompt is generated for a second LLM based on the user submitted question and the matching tabular data including detected links, wherein the second prompt is configured to cause the second LLM to generate a response to the user submitted question. The matching tabular data includes not only the data value(s) from matching portions (e.g., cells and/or rows) of matching storage tables but also the paths of links and linked-to portions within destination table(s). Each path of matching tabular data and link(s) can be represented as a text string that describes each node and link that connects adjacent nodes. The second prompt includes the original user submitted question as well as the path(s) of matching tabular data and link(s) that are represented as text strings. The "second LLM" to which the second LLM is sent may be the same as or a different LLM from the "first LLM" that was prompted at step 2006 to generate the query. The path(s) of matching tabular data and link(s) in this second prompt provide helpful context into which the second LLM can ground its response to the user submitted question.

Returning to the example user submitted question of "What are the tariffs on exhaust pipes from Canada to the US?" and the corresponding tabular data-specific query language query of Object("tariffs").filter(product==exhaust && from==CA && to==US).searchAround(depth=3).find ("suppliers"), the second prompt may include the "What are the tariffs on exhaust pipes supplied from Canada to the US?" and the paths of matching tabular data and links that are responsive to that query.

At 2214, the second prompt is sent to the second LLM.

At 2216, a response from the second LLM is received. The second LLM should have used at least the paths of matching tabular data and links that were provided as context in the second prompt to provide a response to the user submitted question. The response should have referenced or have been informed by the paths of matching tabular data and links.

At 2218, the response is presented at the user interface. For example, the response may include unstructured text and/or structured text (e.g., a table of information, which may or may not include portions of the paths of matching tabular data and links).

Figure 23:
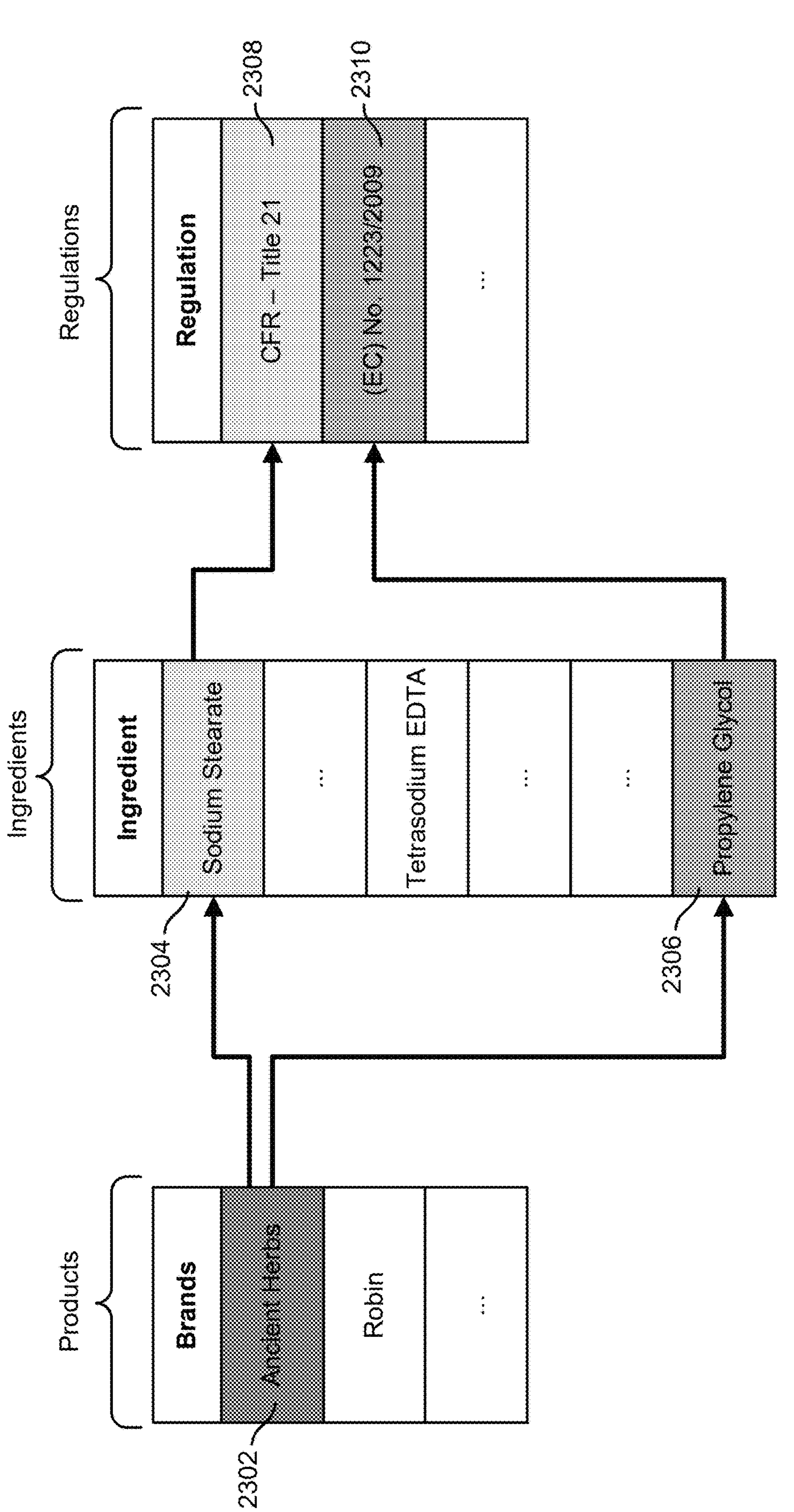
FIG. 23 is a diagram showing example stored tables that are searched based on a query in accordance with some embodiments.

FIG. 23 is a diagram showing example stored tables that are searched based on a query in accordance with some embodiments. In the example of FIG. 23, a given query (written in the tabular data-specific query language) is searched against the tables shown in FIG. 23 using a process such as process 2100 of FIG. 21. Assume that in this example, the query is determined to match the table titled "Products." Within the table titled "Products," cell 2302 containing "Ancient Herbs" is determined to match the query. It is then checked for whether cell 2302 containing "Ancient Herbs" is linked to any portions of another table. Based on this check, it is determined that cell 2302 containing "Ancient Herbs" is linked (e.g., via related entity types of links) to both cell 2304 containing "Sodium Stearate" and cell 2306 containing "Propylene Glycol" of the table titled "Ingredients." For example, such related entity types of links were detected because both "Sodium Stearate" and "Propylene Glycol" are ingredients that are found in the product named "Ancient Herbs." Based on the parameters of this particular query, it is again checked whether each of cell 2304 containing "Sodium Stearate" and cell 2306 containing "Propylene Glycol" is linked to any portions of another table. Based on this check, it is determined that cell 2304 containing "Sodium Stearate" is linked to (e.g., via a related entity type of link) cell 2308 containing "CFR-Title 21" and cell 2306 containing "Propylene Glycol" is linked to (e.g., via a related entity type of link) cell 2310 containing "(EC) No. 1223/2009" of the table titled "Regulations." For example, such related entity types of links were detected because the ingredient "Sodium Stearate" is subject to regulation under "CFR-Title 21" and the ingredient "Propylene Glycol" is subject to regulation under "(EC) No. 1223/2009." As such, there are two paths of nodes (e.g., cells and links) through the stored tables that match the given query that are shown in FIG. 23. The two matching paths can also be represented as text strings. The following are example text string representations of the two matching paths that are illustrated in FIG. 23:

1) Products.brands.Ancient_Herbs=relatedEntity=> Ingredients.ingredient.Sodium_Stearate=related Entity=>Regulations.regulation.CFR-Title21
2) Products.brands.Ancient_Herbs=relatedEntity=> Ingredients.ingredient.Propylene_Glycol=related Entity=>Regulations.regulation.(EC)_No._1223/2009

As mentioned above in process 2200 of FIG. 22, such text string representations of the matching paths in stored tabular data to a query can be passed as context in a prompt to a downstream LLM to request the LLM to answer a user submitted query (written in natural language). By providing not only matching data to a user submitted question but also its relevant connections as detected among stored tabular data, the downstream LLM will have helpful context into which to ground its response to the question included in the prompt. This additional context will also prevent/safeguard the LLM from introducing hallucinations in the response (which is more likely in the absence of relevant/sufficient context).

As shown with the example of FIG. 23, in response to a given query, not only is tabular data that directly matches the query ("Ancient Herbs" from the "Products" table) returned for (e.g., determined to be responsive to) the query, but also the link data associated with the directly matching data (e.g., the described related entity types of links) and the data that is linked to/referenced by (via one link) the directly matching data ("Sodium Stearate" and "Propylene Glycol" of the "Ingredients" table). Because the "Ingredients" table stores data values that are one link (or a link depth of one) away from data values in the "Products" table, "Ingredients" table can be referred to as an "immediate neighbor" to the "Products" table. Put another way, it is possible for data that is not directly responsive to (e.g., matching to) a query to be returned in the matching data if that data is linked (e.g., via a link depth of one or more) to data that is directly responsive to (e.g., matching to) the query. Furthermore, even the link data (e.g., the described related entity types of links) associated with the data ("Sodium Stearate" and "Propylene Glycol" of the "Ingredients" table) as well as the data that is two links (or a link depth of two) away ("CFR-Title 21" and "(EC) No. 1223/2009") from the directly matching data can be included in the return for the query.

Various embodiments of ingesting, extracting, and structuring source data into tabular data are described herein. various embodiments of detecting links among the various granularities (e.g., cell-to-cell, cell-to-groups of cells, row-to-row, row-to-a group of rows, etc.) of stored tabular data (which may include both user provided source data or data supplied by third-party suppliers) to build knowledge maps are also described herein. The knowledge map that is defined by the detected links can be searched through by users with or without technical expertise on the query language for such a search. Furthermore, matching paths (of tabular data and their related links) corresponding to a user submitted question can be obtained from the stored data and can be programmatically forwarded to a downstream LLM to provide rich context for the LLM to answer the original question more accurately.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:

a storage device configured to store tabular data comprising a plurality of tables; and one or more processors configured to:

obtain a set of source data;

extract portions from the set of source data to store in cells within a source dataset according to a source schema determined for the set of source data, wherein the source dataset comprises a source table;

determine a link between a first data value stored in a first cell of the source dataset to a second data value stored in a second cell of a destination dataset of stored tabular data, wherein the destination dataset comprises a destination table, wherein the first cell is included in a first row of the source dataset, wherein the first data value comprises a first set of global positioning data (GPS) data, wherein the second cell is included in a second row of the destination dataset, wherein the second data value comprises a second set of GPS data, wherein to determine the link between the first data value stored in the first cell of the source dataset to the second data value stored in the second cell of the destination dataset of the stored tabular data comprises to:

compare the first set of GPS data to the second set of GPS data to determine a proximity; and in response to a determination that the proximity is less than a threshold, determine that the link is detected between the first row of the source dataset and the second row of the destination dataset, wherein the link comprises a geographical match type of link;

store data associated with the link in a link index, wherein the data associated with the link describes the first cell of the source dataset and the second cell of the destination dataset;

obtain a tabular data-specific query language query;

search at least the source dataset using the tabular data-specific query language query; and in response to a determination that the tabular data-specific query language query matches the first data value stored in the first cell of the source dataset, return the first data value stored in the first cell of the source dataset and the second data value stored in the second cell of the destination dataset based at least in part on the link stored in the link index.

2. The system of claim 1, wherein to extract the portions from the set of source data to store in the cells within the source dataset according to the source schema determined for the set of source data comprises to:

receive user provided target column definitions;

generate a prompt to a large language model (LLM) to cause the LLM to analyze the set of source data to infer candidate column names;

determine a normalized schema for the source table corresponding to the set of source data based on mappings between the user provided target column definitions and the candidate column names obtained from the LLM, wherein the source schema comprises the normalized schema; and populate the source table with rows of data extracted from the set of source data in accordance with the normalized schema.

3. The system of claim 1, wherein the one or more processors are further configured to:

obtain enrichment information corresponding to one or more data values stored in a third row in at least one existing column of the source schema; and add the enrichment information into the third row in a new column of the source dataset.

4. The system of claim 1, wherein the one or more processors are further configured to determine a second link between a third data value stored in a third cell of the source dataset to a fourth data value stored in a fourth cell of the destination dataset of the stored tabular data comprises to:

use a hash table to map the third data value to a corresponding bucket; and in response to a determination that the fourth data value is also stored in the corresponding bucket, determine that the second link is detected between the third data value in the third cell of the source dataset and the fourth data value in the fourth cell of the destination dataset, wherein the second link comprises an exact match type of link.

5. The system of claim 1, wherein the one or more processors are further configured to determine a second link between a third data value stored in a third cell of the source dataset to a fourth data value stored in a fourth cell of the destination dataset of the stored tabular data comprises to:

determine a difference between the third data value stored in the third cell of the source dataset and the fourth data value stored in the fourth cell of the destination dataset of the stored tabular data; and in response to a determination that the difference is less than another threshold, determine that the second link is detected between the third data value in the third cell of the source dataset and the fourth data value in the fourth cell of the destination dataset, wherein the second link comprises a fuzzy match type of link.

6. The system of claim 5, wherein the difference between the third data value stored in the third cell of the source dataset and the fourth data value stored in the fourth cell of the destination dataset of the stored tabular data comprises an edit distance.

7. The system of claim 1, wherein the one or more processors are further configured to determine a second link between a third data value stored in a third cell of the source dataset to a fourth data value stored in a fourth cell of the destination dataset of the stored tabular data comprises to:

determine a first vector based at least in part on a first set of data values stored in cells in a third row of the source dataset, wherein the third row includes the third cell;

determine a second vector based at least in part on a second set of data values stored in cells in a fourth row of the destination dataset, wherein the fourth row includes the fourth cell;

compare the first vector against the second vector to determine a similarity; and in response to a determination that the similarity is greater than another threshold, determine that the second link is detected between the third row of the source dataset and the fourth row of the destination dataset, wherein the second link comprises a vector match type of link.

8. The system of claim 1, wherein the proximity comprises a first proximity, wherein the threshold comprises a first threshold, wherein a third cell is included in a third row of the source dataset and includes a third data value that comprises a first set of taxonomy data, wherein a fourth cell is included in a fourth row of the destination dataset and includes a fourth data value that comprises a second set of taxonomy data, wherein the one or more processors are further configured to determine a second link between the third data value stored in the third cell of the source dataset to the fourth data value stored in the fourth cell of the destination dataset of the stored tabular data comprises to:

compare the first set of taxonomy data to the second set of taxonomy data to determine a second proximity; and in response to a determination that the second proximity is less than a second threshold, determine that the second link is detected between the third row of the source dataset and the fourth row of the destination dataset, wherein the second link comprises a related entity type of link.

9. The system of claim 1, wherein to obtain the tabular data-specific query language query comprises to:

receive, via a user interface, a user submitted question;

generate a prompt to a large language model (LLM), wherein the prompt is configured to cause the LLM to generate the tabular data-specific query language query based at least in part on the user submitted question;

send the prompt to the LLM; and receive the tabular data-specific query language query from the LLM.

10. The system of claim 1, wherein the one or more processors are further configured to return a link type associated with the link.

11. The system of claim 1, wherein the destination dataset comprises a first destination dataset, wherein the link comprises a first link, and wherein the one or more processors are further configured to:

determine whether to hide a second link between the first data value stored in the first cell and a third data value stored in a third cell in a second destination dataset; and in response to a determination to hide the second link, omit returning information on the second link and the third data value.

12. The system of claim 1, wherein to return the first data value stored in the first cell and the second data value stored in the second cell based at least in part on the link comprises to:

format the first data value, the link, and the second data value in a string representation; and generate a prompt to a large language model (LLM) that includes a user submitted question and the string representation of the first data value, the link, and the second data value.

13. A method, comprising:

obtaining a set of source data;

extracting portions from the set of source data to store in cells within a source dataset according to a source schema determined for the set of source data, wherein the source dataset comprises a source table;

determining a link between a first data value stored in a first cell of the source dataset to a second data value stored in a second cell of a destination dataset of stored tabular data, wherein the destination dataset comprises a destination table, wherein the first cell is included in a first row of the source dataset, wherein the first data value comprises a first set of global positioning data (GPS) data, wherein the second cell is included in a second row of the destination dataset, wherein the second data value comprises a second set of GPS data, wherein determining the link between the first data value stored in the first cell of the source dataset to the second data value stored in the second cell of the destination dataset of the stored tabular data comprises:

comparing the first set of GPS data to the second set of GPS data to determine a proximity; and in response to a determination that the proximity is less than a threshold, determining that the link is detected between the first row of the source dataset and the second row of the destination dataset, wherein the link comprises a geographical match type of link;

storing data associated with the link in a link index, wherein the data associated with the link describes the first cell of the source dataset and the second cell of the destination dataset;

obtaining a tabular data-specific query language query;

searching at least the source dataset using the tabular data-specific query language query; and in response to a determination that the tabular data-specific query language query matches the first data value stored in the first cell of the source dataset, returning the first data value stored in the first cell of the source dataset and the second data value stored in the second cell of the destination dataset based at least in part on the link stored in the link index.

14. The method of claim 13, wherein extracting the portions from the set of source data to store in the cells within the source dataset according to the source schema determined for the set of source data comprises:

receiving user provided target column definitions;

generating a prompt to a large language model (LLM) to cause the LLM to analyze the set of source data to infer candidate column names;

determining a normalized schema for a new source table corresponding to the set of source data based on mappings between the user provided target column definitions and the candidate column names obtained from the LLM, wherein the source schema comprises the normalized schema; and populating the source table with rows of data extracted from the set of source data in accordance with the normalized schema.

15. The method of claim 13, further comprising:

obtaining enrichment information corresponding to one or more data values stored in a third row in at least one existing column of the source schema; and adding the enrichment information into the third row in a new column of the source dataset.

16. The method of claim 13, further comprising determining a second link between a third data value stored in a third cell of the source dataset to a fourth data value stored in a fourth cell of the destination dataset of the stored tabular data comprises:

using a hash table to map the third data value to a corresponding bucket; and in response to a determination that the fourth data value is also stored in the corresponding bucket, determining that the second link is detected between the third data value in the third cell of the source dataset and the fourth data value in the fourth cell of the destination dataset, wherein the second link comprises an exact match type of link.

17. The method of claim 13, further comprising determining a second link between a third data value stored in a third cell of the source dataset to a fourth data value stored in a fourth cell of the destination dataset of the stored tabular data comprises:

determining a difference between the third data value stored in the third cell of the source dataset and the fourth data value stored in a fourth cell of the destination dataset of the stored tabular data; and in response to a determination that the difference is less than a difference threshold, determining that the second link is detected between the third data value in the third cell of the source dataset and the fourth data value in the fourth cell of the destination dataset, wherein the second link comprises a fuzzy match type of link.

18. The method of claim 13, further comprising determining a second link between a third data value stored in a third cell of the source dataset to a fourth data value stored in a fourth cell of the destination dataset of the stored tabular data comprises:

determining a first vector based at least in part on a first set of data values stored in cells in a third row of the source dataset, wherein the third row includes the third cell;

determining a second vector based at least in part on a second set of data values stored in cells in a fourth row of the destination dataset, wherein the fourth row includes the fourth cell;

comparing the first vector against the second vector to determine a similarity; and in response to a determination that the similarity is greater than another threshold, determining that the second link is detected between the third row of the source dataset and the fourth row of the destination dataset, wherein the second link comprises a vector match type of link.

* * * * *